United States Patent
Echigo et al.

(10) Patent No.: US 7,247,592 B2
(45) Date of Patent: Jul. 24, 2007

(54) METHOD OF ACTIVATING CATALYST FOR CARBON MONOXIDE REMOVAL

(75) Inventors: Mitsuaki Echigo, Osaka (JP); Takeshi Tabata, Osaka (JP); Hirokazu Sasaki, Osaka (JP); Osamu Yamazaki, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 498 days.

(21) Appl. No.: 10/380,811

(22) PCT Filed: Sep. 14, 2001

(86) PCT No.: PCT/JP01/08023

§ 371 (c)(1),
(2), (4) Date: Mar. 18, 2003

(87) PCT Pub. No.: WO02/22256

PCT Pub. Date: Mar. 21, 2002

(65) Prior Publication Data

US 2004/0038093 A1    Feb. 26, 2004

(30) Foreign Application Priority Data

Sep. 18, 2000   (JP) ............................. 2000-281936
May 10, 2001   (JP) ............................. 2001-140385

(51) Int. Cl.
  *B01J 20/34*   (2006.01)
(52) U.S. Cl. ........................................................ 502/53
(58) Field of Classification Search ................. 502/34, 502/53, 56
See application file for complete search history.

(56) References Cited

U.S. PATENT DOCUMENTS

| | | | | |
|---|---|---|---|---|
| 4,752,595 A | * | 6/1988 | McCullen et al. | ............ 502/50 |
| 5,378,669 A | * | 1/1995 | Fung | ............................ 502/37 |
| 6,074,770 A | * | 6/2000 | Autenrieth et al. | ........... 429/19 |
| 6,350,423 B1 | * | 2/2002 | Aoyama | ..................... 423/247 |

FOREIGN PATENT DOCUMENTS

| | | |
|---|---|---|
| DE | 100 53 989 A1 | 5/2001 |
| EP | 0 710 996 A | 5/1996 |
| EP | 0 941 963 A | 9/1999 |
| EP | 1 046 612 A | 10/2000 |
| JP | 08-295503 | 11/1996 |
| JP | 1997 9-30802 A | 2/1997 |
| JP | 1998 10-29802 A | 2/1998 |
| JP | 1998 10-29803 A | 2/1998 |
| JP | 2000-169107 | 6/2000 |
| JP | 2001-087650 | 4/2001 |
| JP | 2001 2001-129401 A | 6/2003 |
| WO | WO 00/17097 A | 3/2000 |

* cited by examiner

*Primary Examiner*—Edward M. Johnson
(74) *Attorney, Agent, or Firm*—The Webb Law Firm

(57) ABSTRACT

A carbon monoxide removing catalyst such as a ruthenium supporting catalyst is provided for removing, through oxidation thereof, carbon monoxide from an alcohol reformed gas containing hydrogen and carbon monoxide to be supplied to a fuel cell. For its activation, the catalyst is caused to contact an inactive gas or a hydrogen-containing inactive gas consisting of less than 50 volume % of hydrogen gas and the remaining volume of inactive gas, thereby to avoid poisoning of the electrode of the fuel cell with carbon monoxide.

4 Claims, 5 Drawing Sheets

METHOD OF ACTIVATING CATALYST FOR CARBON MONOXIDE REMOVAL

BACKGROUND OF THE INVENTION

1. Field of the Invention

The present invention relates to a carbon-monoxide removing (removal) catalyst for removing mainly carbon monoxide from a gas containing hydrogen ($H_2$) gas as the major component thereof and containing also a small amount of carbon monoxide (CO) gas, such as a reformed gas obtained by reforming (steam reforming, partial oxidation reforming, etc.) a hydrocarbon such as a natural gas, naphtha, kerosene or the like and an alcohol such as methanol. The invention relates also to a method of removing carbon monoxide therefrom.

2. Description of the Prior Art

Conventionally, with a fuel reforming apparatus for manufacturing reformed gas (gas containing 40 volume % or more (dry base) of hydrogen) with using fossil fuel such as natural gas as raw material, the raw material was desulfurized and steam-reformed through a desulfurizer and a steam reformer disposed one after another, thereby to obtain the reformed gas containing hydrogen as the major component thereof and carbon monoxide, carbon dioxide ($CO_2$), water ($H_2O$), etc. Further, with a fuel reforming apparatus using an alcohol such as methane as the raw material, the apparatus includes a methanol reformer incorporating a methanol reforming catalyst, thereby to obtain, from methanol, a reformed gas containing hydrogen as the major component thereof and carbon monoxide, carbon dioxide, water, etc.

Here, with a fuel reforming apparatus for making a reformed gas for use in a phosphoric acid fuel cell, it is known that the electrode catalyst of the fuel cell is poisoned by the presence of carbon monoxide. Therefore, in order to prevent poisoning of the electrode catalyst, the gas containing hydrogen as the major component thereof was introduced to a carbon-monoxide shift converter for converting carbon monoxide into carbon dioxide ($CO_2$) through a carbon monoxide shift converting reaction, thereby to obtain a reformed gas with the carbon monoxide concentration in the gas being lower than a predetermined value (e.g. 0.5%).

However, in the case of a fuel reforming apparatus for producing a reformed gas for use in a polymer electrolyte fuel cell, since this polymer electrolyte fuel cell operates at a low temperature of about 80° C., its electrode catalyst will be poisoned even if just a trace amount of carbon monoxide is present. Therefore, it is necessary to further reduce carbon monoxide to be contained in the reformed gas. So, on the downstream of the carbon monoxide shift converter, there was provided a carbon monoxide remover incorporating a carbon monoxide removing catalyst for removing carbon monoxide. With this, the reformed gas treated by the carbon monoxide shift converter was introduced, with addition thereto of an oxidizer such as air, to the carbon monoxide remover, so that carbon monoxide was oxidized into carbon dioxide in the presence of this carbon monoxide removing catalyst, whereby a reformed gas with reduced carbon monoxide concentration lower than a predetermined concentration (e.g. 100 ppm or lower) was obtained.

As this type of carbon monoxide removing catalyst, there is employed a precious metal catalyst comprising ruthenium (Ru), rhodium (Rh), platinum (Pt), palladium (Pd) or the like supported on a support made of e.g. alumina. And, conventionally, such catalyst was directly put for use in the elimination of carbon monoxide, without effecting any activating treatment on the catalyst. Or, there was proposed an activating method in which the carbon monoxide removing catalyst is subjected to a pre-treatment in a gas atmosphere containing hydrogen as the major component thereof (50 mol % or more) and then the catalyst is put to use without being exposed to air (see Japanese Patent Application "Kokai" No.: Hei. 10-29802). This may be because exposure to air is believed to lead to reduction in the catalyst activity.

However, in order to remove carbon monoxide from the above-described reformed gas to achieve its concentration of 10 ppm or less by using the conventional carbon monoxide removing catalyst, it was necessary to add an excessive amount of oxidizer (oxygen) thereto. Moreover, when the carbon monoxide removing catalyst is to be used at a low temperature (e.g. near 100° C.), its catalyst activity is low, so that carbon monoxide could not be removed effectively. Accordingly, in order to remove a greater amount of carbon monoxide, it was necessary to use the carbon monoxide removing catalyst at a high temperature range (near about 200° C.) so as to enhance its activity.

When carbon monoxide is to be removed from the above-described mixture gas containing hydrogen and carbon monoxide, it is known that the carbon monoxide removing catalyst employed would provide not only the useful effect of removing carbon monoxide, but also side reactions which consume the hydrogen contained in the mixture gas to produce carbon monoxide, methane, and water (respectively referred to as a reverse shift reaction of carbon dioxide, a methanation reaction of carbon dioxide, and combustion reaction of hydrogen). Especially, these side reactions are apt to occur when the temperature of the carbon monoxide removing catalyst is high (e.g. 200° C. or higher).

Therefore, if the carbon monoxide removing catalyst is used at a high temperature range in order to remove a greater amount of carbon monoxide, there occurs the problem of the above-described methanation reaction being very much promoted. This is problematic not only in that the hydrogen needed by the fuel cell is consumed inadvertently in the methanation reaction, but also in that the temperature will be further elevated due to the reaction heat from the methanation reaction. Moreover, there is still another problem of the carbon monoxide removing catalyst being poisoned with iron, thus resulting in performance degradation.

In this regard, the following mechanism is believed to be responsible for the poisoning of the carbon monoxide removing catalyst with iron. First, when a high-temperature reaction gas containing hydrogen and carbon monoxide is introduced into the carbon monoxide remover, bonding occurs between the carbon monoxide and iron contained in the stainless steel forming a reaction tube of the carbon monoxide remover, thereby to produce a compound similar in structure to iron carbonyl ($Fe(CO)_5$). As this iron carbonyl moves together with the mixture gas to adhere to the catalyst portion of the carbon monoxide remover, this carbon monoxide removing catalyst will be poisoned. One method to avoid this poisoning of the carbon monoxide removing catalyst with iron, there is known a method for rendering the temperature of the reaction gas to be introduced to be lower than 100° C. so as to prevent production of the iron carbonyl inside the reaction tube. As described above, such method for protecting the carbon monoxide removing catalyst against iron poisoning is also required.

Moreover, if a large amount of water is contained in the reaction gas to be introduced into the carbon monoxide remover, the water will aggregate and form dew within the pipe or carbon monoxide remover if the temperature of the reaction gas introduced to an inlet of the carbon monoxide remover is reduced to 100° C. or lower. The dew formation can result in random variations in the cross sectional area and the volume of the reaction gas passage within the carbon monoxide remover, which results, in turn, in random variation of the flow rate of the reaction gas being supplied into the carbon monoxide remover and/or in wetting of the carbon monoxide removing catalyst housed in the carbon monoxide remover with the aggregated water, leading to reduction in its activity.

The present invention has been made in view of the above-described drawbacks and its object is to provide a method of activating a carbon monoxide removing catalyst for activating the carbon monoxide removing catalyst for removing, mainly through its oxidation, carbon monoxide present in a mixture gas containing hydrogen and the carbon monoxide by causing the catalyst to contact an inactive gas or a hydrogen-containing inactive gas consisting of less than 50 volume % of hydrogen gas and the remaining volume of inactive gas.

SUMMARY OF THE INVENTION

For accomplishing the first object noted above, the invention method of activating a carbon monoxide removing catalyst has first through fifth characterizing features described below.

The first characterizing feature resides in that in the carbon monoxide removing catalyst for removing, through oxidation thereof, carbon monoxide present in the mixture gas containing hydrogen and the carbon monoxide is activated by being caused to contact an inactive gas or a hydrogen-containing inactive gas consisting of less than 50 volume % of hydrogen gas and the remaining volume of inactive gas.

Through extensive research, the present inventors discovered that the carbon monoxide removing catalyst can be significantly activated by being caused to contact an inactive gas or a hydrogen-containing inactive gas consisting of less than 50 volume % of hydrogen gas and the remaining volume of inactive gas and has perfected this invention based on this discovery. When the carbon monoxide remover accommodating therein the carbon monoxide removing catalyst activated in the manner described above is operated at a low temperature (e.g. 70 to 120° C.), a good carbon monoxide removing activity can be obtained from the start of the operation. Incidentally, it has been revealed that if a low ratio of hydrogen is added to the above-described inactive gas, the carbon monoxide removing catalyst after the activation can provide high oxidation performance and also energy consumption can be restricted even when the activating temperature for the carbon monoxide removing catalyst is lowered. In practice, less than 50 volume % is sufficient as the ratio of the hydrogen to be added to the inactive gas.

With the above, the carbon monoxide remover is capable of reducing the carbon monoxide concentration in the reformed gas to be lower than a predetermined value from the start of its operation; and a high-quality reformed gas which can be supplied even to a polymer electrolyte fuel cell can be obtained with minimizing the loss of hydrogen due to the side reactions. Further, it is also possible to remove the trouble of preparing in stock a large amount of high-concentration hydrogen gas for the sole purpose of the activation of the carbon monoxide removing catalyst. Here, the term: nactive gas refers to a gas which alone does not react with the carbon monoxide removing catalyst.

The second characterizing feature resides in that said inactive gas contains at least one kind of gas selected from the group consisting of nitrogen gas, helium gas, argon gas and carbon dioxide gas.

With this, such gas selected from the group consisting of nitrogen gas, helium gas, argon gas and carbon dioxide gas can be available at a relatively low cost and can be readily stored. Further, as such gas hardly reacts with materials forming other components than the carbon monoxide removing catalyst, the trouble of corrosion will hardly occur.

The third characterizing feature resides in that said hydrogen-containing inactive gas consists of less than 10 volume % of hydrogen gas and the remaining volume of the inactive gas.

With this feature, as will become apparent from the disclosure of the embodiment, even when the concentration of the hydrogen gas to be added to the inactive gas is lower than 10 volume %, this will be sufficient for enhancing the initial activity of the carbon monoxide removing catalyst.

Further, the gas having such composition provides a unique advantage of being usable also as a gas to be supplied for reduction of the catalyst in the carbon monoxide shift converter disposed upstream of the carbon monoxide remover or the catalyst in the alcohol reformer (e.g. the methanol reformer). That is to say, the catalysts to be incorporated within the alcohol reformer and the carbon monoxide shift converter can be easily oxidized. For this reason, copper-zinc type catalyst is generally available in the form of copper oxide-zinc monoxide as an oxide. And, the catalyst as such oxide is charged into a each receptacle and then heated under reducing gas (hydrogen gas) atmosphere for reducing the copper oxide into copper and then put to use.

In the above, with this type of catalyst, if the concentration of hydrogen gas used in the reducing operation is high, the hydrogen gas will violently react with the catalyst to generate heat, which would tend to result in sintering. Such sintering will deteriorate the catalyst. For this reason, according to the convention, the hydrogen gas was diluted to be lower than 10 volume % with the inactive gas such as nitrogen gas and supplied in this diluted form and then subjected to the reducing treatment at 260° C. or lower, thereby to restrict the heat generation. On the other hand, in the case of the carbon monoxide removing catalyst (e.g. comprising alumina as its support and ruthenium supported thereon), as ruthenium has high resistance against oxidation, it was believed that the catalyst can be used without effecting any reducing treatment before use, if a reducing treatment is effected when ruthenium is supported on the alumina support.

Accordingly, it was not known that the carbon monoxide removing catalyst can be activated by gas obtained by diluting the hydrogen gas to be lower than 10 volume % with an inactive gas such as nitrogen gas. And, the present inventors new finding resides in that the gas having the same composition as above can effect simultaneously and continuously both the reduction of the alcohol reforming catalyst or the carbon monoxide shift converting catalyst and the activation of the carbon monoxide removing catalyst.

With the above, in providing any necessary facilities for the activating process as a pre-treatment of the fuel reforming apparatus before its use, it becomes unnecessary to provide separately e.g. a reducing facility and material for the carbon monoxide reforming catalyst and a pre-treatment facility and material for the carbon monoxide removing catalyst.

The fourth characterizing feature resides in that the activation of the carbon monoxide removing catalyst is effected at from 80° C. to 400° C.

With this characterizing feature, if the activation is effected at a temperature higher than 80° C., as shown in FIGS. 3-5 and Tables 1 and 2, in e.g. production of the reforming gas, the concentration of carbon monoxide present in the mixture gas may be reduced significantly. Incidentally, if the activation is effected at a temperature higher than 400° C., this will lead to not only disadvantageous increase in the energy required for the heating, but also to risk of sintering of the catalyst. Hence, the activation should be effected in the range from 80 to 400° C.

More preferably, if the temperature of activation is from 120 to 250° C., regardless of presence/absence of hydrogen in the inactive gas, it becomes possible to reduce the concentration of carbon monoxide present in the mixture gas to be lower than 100 ppm from the initial stage of the reaction (see FIGS. 3 through 5 and Tables 1 and 2).

Further, in the case of activation with the inactive gas containing less than 10 volume % of hydrogen gas, by effecting this activation at from 80 to 250° C., the concentration of carbon monoxide present in the mixture can be reduced from 5000 ppm to less than 50 or 100 ppm (see FIGS. 3 through 5 and Table 2). Further, if the activation is effected at from 120 to 250° C., the carbon monoxide concentration can be reduced to be lower than 10 ppm (see FIGS. 3 through 5 and Table 2). If the carbon monoxide concentration is reduced to such level, this will provide an effect of significantly restricting the poisoning of the electrode catalyst of the fuel cell with carbon monoxide, thereby to extend the service life of the electrode catalyst.

The fifth characterizing feature resides in that the mixture gas containing hydrogen and carbon monoxide comprises a reformed gas obtained by reforming a hydrocarbon or an alcohol.

With this characterizing feature, when the mixture gas containing hydrogen and carbon monoxide comprises a reformed gas obtained by reforming a hydrocarbon or an alcohol, if the carbon monoxide removing catalyst is activated by the method of activating carbon monoxide removing catalyst according to any one of the above-described first through fourth characterizing features, the carbon monoxide present in the reformed gas may be removed to a low concentration, so that a high-quality reformed gas usable for a polymer electrolyte fuel cell can be obtained advantageously.

The carbon monoxide removing catalyst also relating to the present invention has sixth through ninth characterizing features described next.

The sixth characterizing feature resides in that a carbon monoxide removing catalyst for removing carbon monoxide from a mixture gas containing hydrogen and the carbon monoxide, the catalyst being formed by supporting ruthenium on a support, wherein 50% or more of ruthenium atoms present in a surface portion of the catalyst layer as determined by ESCA are present as ruthenium in the form of metal.

With this characterizing feature, 50% or more of the ruthenium atoms present on the surface of the carbon monoxide removing catalyst are present as ruthenium in the form of metal (Ru(O)), the catalyst function on the ruthenium catalyst surface is under an activated condition. As a result, it is possible to remove carbon monoxide over a wider temperature range and to a lower concentration than the conventional carbon monoxide removing catalyst. Specifically, even when the carbon monoxide removing catalyst is used at a low temperature of about 100° C. to about 120° C. where the activity of the conventional catalyst is low, the carbon monoxide concentration can be reduced to a low level of 10 ppm or lower. As described above, since the carbon monoxide removing catalyst can effectively remove carbon monoxide even when used at a low temperature range, it is possible to restrict sufficiently the side reactions represented by the methanation of carbon dioxide which was a problem in case of the convention when the catalyst is employed at a high temperature and the carbon monoxide can be reduced selectively.

The seventh characterizing feature resides in that a carbon monoxide removing catalyst for removing carbon monoxide from a mixture gas containing hydrogen and the carbon monoxide, the catalyst being formed by supporting ruthenium on a support, wherein the carbon monoxide is activated by being caused to contact an inactive gas or a hydrogen-containing inactive gas consisting of less than 50 volume % of hydrogen gas and the remaining volume of inactive gas so that 50% or more of ruthenium atoms present on a surface layer of the catalyst as determined by ESCA are present as ruthenium in the form of metal.

With this characterizing feature, the catalyst is activated by being caused to contact an inactive gas or a hydrogen-containing inactive gas consisting of less than 50 volume % of hydrogen gas and the remaining volume of inactive gas so that 50% or more of ruthenium atoms present in the surface portion of the catalyst layer as determined by ESCA are present as ruthenium in the form of metal. So that, the catalyst function on the ruthenium catalyst surface is under an activated condition. As a result, it is possible to remove carbon monoxide over a wider temperature range and to a lower concentration than the conventional carbon monoxide removing catalyst. Specifically, even when the carbon monoxide removing catalyst is used at a low temperature of about 100° C. where the activity of the conventional catalyst is low, the carbon monoxide concentration can be reduced to a low level of 10 ppm or lower. As described above, since the carbon monoxide removing catalyst can effectively remove carbon monoxide even when used at a low temperature range, it is possible to restrict sufficiently the side reactions represented by the methanation of carbon dioxide which was a problem in case of the convention when the catalyst is employed at a high temperature and the carbon monoxide can be reduced selectively.

The eighth characterizing feature resides in that 65% or more of ruthenium atoms present on a surface layer of the catalyst as determined by ESCA are present as ruthenium in the form of metal.

With this characterizing feature, as 65% or more of ruthenium atoms present in the surface portion of the catalyst layer as determined by ESCA are present as ruthenium in the form of metal (Ru(O)), the catalyst function on the ruthenium catalyst surface is under an even more activated condition. As result, carbon monoxide can be removed even more effectively.

The ninth characterizing feature resides in that the support comprises alumina.

With this characterizing feature, if the support comprises alumina, the material for the support is available inexpensively. In addition, thanks to its structural feature, there can be obtained a further effect of increased effective area of the catalyst. As a result, as a greater amount of catalyst reaction can occur on the catalyst surface, carbon monoxide can be effectively removed.

The method of removing carbon monoxide also relating to the present invention has tenth through fourteenth characterizing features described below.

The tenth characterizing feature resides in that a carbon monoxide removing catalyst for removing, through oxidation thereof, carbon monoxide present in the mixture gas containing hydrogen and carbon monoxide is caused to contact an inactive gas or a hydrogen-containing inactive gas consisting of less than 50 volume % of hydrogen gas and the remaining volume of inactive gas to be activated thereby and then the mixture gas and an oxidizer are allowed to react on the carbon monoxide removing catalyst thereby to remove the carbon monoxide.

With this characterizing feature, by activating a carbon monoxide removing catalyst for removing, through oxidation thereof, carbon monoxide present in the mixture gas containing hydrogen and carbon monoxide by causing the catalyst to contact an inactive gas or a hydrogen-containing inactive gas consisting of less than 50 volume % of hydrogen gas and the remaining volume of inactive gas and causing the mixture gas and an oxidizer to react on the carbon monoxide removing catalyst thereby to remove the carbon monoxide, the concentration of the carbon monoxide present in the mixture gas may be reduced to be lower than a predetermined value. As a result, a high-quality reformed gas which can be supplied even to a polymer electrolyte fuel cell can be obtained with minimizing the loss of hydrogen due to the side reactions. Further, it is also possible to remove the trouble of preparing in stock a large amount of high-concentration hydrogen gas for the sole purpose of the activation of the carbon monoxide removing catalyst.

The eleventh characterizing feature resides in that said hydrogen-containing inactive gas consists of less than 10 volume % of hydrogen gas and the remaining volume of the inactive gas.

With this characterizing feature, said hydrogen-containing inactive gas consists of less than 10 volume % of hydrogen gas and the remaining volume of the inactive gas. Then, this gas is usable also as a gas to be supplied for reduction of the catalyst in the carbon monoxide shift converter or the catalyst in the alcohol reformer (e.g. the methanol reformer) disposed upstream of the carbon monoxide remover.

Here, if the carbon monoxide removing catalyst is activated with the hydrogen-containing inactive gas at from 80 to 250° C., the concentration of carbon monoxide present in the mixture can be reduced to be less than 100 ppm (see FIGS. 3 through 5 and Table 2). Further, if the carbon monoxide concentration is reduced to such level, it is possible to obtain the mixture gas which can be supplied to the solid polymer fuel cell from the beginning of the operation of the carbon monoxide remover. Further, if the activation is effected at a temperature from 120 to 250° C., it is possible to reduce the carbon monoxide concentration to be lower than 10 ppm (see FIGS. 3 through 5 and Table 2). If the carbon monoxide concentration is reduced to such level, this will provide an effect of significantly restricting the poisoning of the electrode catalyst of the fuel cell with carbon monoxide, thereby to extend the service life of the electrode catalyst.

The twelfth characterizing feature resides in that the method comprises the steps of: introducing a reaction gas comprising said mixture gas and an oxidizer added thereto into a carbon monoxide remover having a housing accommodating therein said carbon monoxide removing catalyst according any one of the sixth through ninth characterizing features and removing the carbon monoxide by causing said oxidizer and said mixture gas to react on said carbon monoxide removing catalyst.

With this characterizing feature, in the method comprising the steps of: introducing a reaction gas comprising said mixture gas and an oxidizer added thereto into a carbon monoxide remover having a housing accommodating therein said carbon monoxide removing catalyst and removing the carbon monoxide by causing said oxidizer and said mixture gas to react on said carbon monoxide removing catalyst, 50% or more of ruthenium atoms present in the surface portion of the catalyst layer as determined by ESCA are present as ruthenium in the form of metal. Hence, the catalyst function on the ruthenium catalyst surface is under an activated condition. As a result, it is possible to remove carbon monoxide introduced into the carbon monoxide remover during the introducing step. Specifically, even when the carbon monoxide removing catalyst is used at a low temperature of about 100° C. where the activity of the conventional catalyst is low, the carbon monoxide concentration can be reduced to a low level of 10 ppm or lower. As described above, since the carbon monoxide removing catalyst can effectively remove carbon monoxide even when used at a low temperature range, it is possible to restrict sufficiently the side reactions represented by the methanation of carbon dioxide which was a problem in case of the convention when the catalyst is employed at a high temperature and the carbon monoxide can be reduced selectively.

The thirteenth characterizing feature resides in that in the introducing step, the reaction gas is introduced at a temperature lower than 100° C.

With this characterizing feature, in the method comprising the steps of: introducing a reaction gas comprising said mixture gas and an oxidizer added thereto into a carbon monoxide remover having a housing accommodating therein said carbon monoxide removing catalyst and removing the carbon monoxide by causing said oxidizer and said mixture gas to react on said carbon monoxide removing catalyst, if in the introducing step, the reaction gas is introduced at a temperature lower than 100° C., generation of iron carbonyl can be restricted, probably due to bonding between iron constituting the pipe or the like and carbon monoxide becomes difficult to occur. Further, even if the iron carbonyl were generated, since its boiling point is 103° C., evaporation thereof can be restricted by maintaining the reaction gas at the temperature lower than 100° C., whereby introduction of iron carbonyl into the carbon monoxide remover disposed downstream of the pipe can be effectively restricted. As a result, iron poisoning of the carbon monoxide removing catalyst can be avoided.

The fourteenth characterizing feature resides in that the reaction gas has a dew point of 60° C. or lower.

With this characterizing feature, by adapting the reaction gas introduced to the entrance of the carbon monoxide remover to have a dew point of 60° C. or lower under the processing pressure, even if a low-temperature reaction gas is introduced to the carbon monoxide remover in order to avoid iron poisoning, it is still possible to prevent dew formation of moisture present in the reaction gas inside the carbon monoxide remover. Therefore, as this restricts wetting of the carbon monoxide removing catalyst, degradation in the activity of the catalyst function will hardly occur and also the amount of variation in the flow amount of the reaction gas inside the pipe or inside the carbon monoxide remover can be effectively minimized.

Further, a method of operating a fuel cell system also relating to the present invention has fifteenth and sixteenth characterizing features described below.

The fifteenth characterizing feature resides in that a method of operating a fuel cell system including in a supply passage for a reformed gas to be supplied to a fuel cell from the upstream side thereof: a carbon monoxide shift converter having a housing accommodating therein a carbon monoxide shift converting catalyst for converting carbon monoxide present in the reformed gas into carbon dioxide and a carbon monoxide remover accommodating a carbon monoxide removing catalyst for removing, through oxidation thereof, the carbon monoxide present in the reformed gas, in the mentioned order, the method comprising the steps of: supplying a hydrogen-containing inactive gas consisting of less than 10 volume % of hydrogen gas and the remaining volume of inactive gas to said carbon monoxide shift converter and said carbon monoxide remover thereby to reduce said carbon monoxide shift converting catalyst and also to activate said carbon monoxide removing catalyst and then initiating carbon monoxide shift reaction and carbon monoxide removal reaction on said reformed gas.

With this characterizing feature, in operating a fuel cell system including in a supply passage for a reformed gas to be supplied to a fuel cell from the upstream side thereof: a carbon monoxide shift converter having a housing accommodating therein a carbon monoxide shift converting catalyst for converting carbon monoxide present in the reformed gas into carbon dioxide and a carbon monoxide remover accommodating a carbon monoxide removing catalyst for removing, through oxidation thereof, the carbon monoxide present in the reformed gas, in the mentioned order, by supplying a hydrogen-containing inactive gas consisting of less than 10 volume % of hydrogen gas and the remaining volume of inactive gas to said carbon monoxide shift converter and said carbon monoxide remover thereby to reduce said carbon monoxide shift converting catalyst and also to activate said carbon monoxide removing catalyst and then initiating carbon monoxide conversion and carbon monoxide elimination on said reformed gas, the carbon monoxide remover can reduce the carbon monoxide concentration of the reformed gas to be lower than a predetermined value from the start of its operation. Hence, a high-quality reformed gas which can be supplied even to a polymer electrolyte fuel cell can be obtained with minimizing the loss of hydrogen due to the side reactions. Further, as will become apparent from the disclosure of the embodiment, as the activating temperature required for ensuring sufficient initial activity of the carbon monoxide removing catalyst is reduced compared with the case of providing only an inactive gas not containing hydrogen, the energy consumption can be restricted.

Further, the gas having such composition provides a unique advantage of being usable also as a gas to be supplied for reduction of the catalyst in the carbon monoxide shift converter disposed upstream of the carbon monoxide remover. Therefore, it is possible to effect simultaneously and continuously both the reduction of the carbon monoxide converting catalyst and the activation of the carbon monoxide shift removing catalyst. And, in providing any necessary facilities for the activating process as a pre-treatment of the fuel reforming apparatus before its use, it becomes unnecessary to provide separately e.g. a reducing facility and material for the carbon monoxide reforming catalyst and a pre-treatment facility and material for the carbon monoxide removing catalyst.

Here, if the carbon monoxide removing catalyst is activated with the hydrogen-containing inactive gas at from 80 to 250° C., the concentration of carbon monoxide present in the reformed gas can be reduced to be less than 100 ppm (see FIGS. 3 through 5 and Table 2). Further, if the carbon monoxide concentration is reduced to such level, it is possible to obtain the reformed gas which can be supplied to the solid polymer fuel cell from the beginning of the operation of the carbon monoxide remover. Further, if the activation is effected at a temperature from 120 to 250° C., it is possible to reduce the carbon monoxide concentration to be lower than 10 ppm (see FIGS. 3 through 5 and Table 2). If the carbon monoxide concentration is reduced to such level, this will provide an effect of significantly restricting the poisoning of the electrode catalyst of the fuel cell with carbon monoxide, thereby to extend the service life of the electrode catalyst.

The sixteenth characterizing feature resides in that a method of operating a fuel cell system including in a supply passage for a reformed gas to be supplied to a fuel cell from the upstream side thereof: a methanol reformer accommodating a methanol reforming catalyst for reforming methanol and a carbon monoxide remover accommodating a carbon monoxide removing catalyst for removing, through oxidation thereof, the carbon monoxide present in the reformed gas, in the mentioned order, the method comprising the steps of: supplying a hydrogen-containing inactive gas consisting of less than 10 volume % of hydrogen gas and the remaining volume of inactive gas to said methanol reformer and said carbon monoxide remover thereby to reduce said methanol reforming catalyst and also to activate said carbon monoxide removing catalyst and then initiating methanol reforming reaction and carbon monoxide removal reaction on said reformed gas.

With this characterizing feature, in operating a fuel cell system including in a supply passage for a reformed gas to be supplied to a fuel cell from the upstream side thereof: a methanol reformer accommodating a methanol reforming catalyst for reforming methanol and a carbon monoxide remover accommodating a carbon monoxide removing catalyst for removing, through oxidation thereof, the carbon monoxide present in the reformed gas, in the mentioned order, by supplying a hydrogen-containing inactive gas consisting of less than 10 volume % of hydrogen gas and the remaining volume of inactive gas to said methanol reformer and said carbon monoxide remover thereby to reduce said methanol reforming catalyst and also to activate said carbon monoxide removing catalyst and then initiating methanol reforming and carbon monoxide elimination on said reformed gas, the carbon monoxide remover can reduce the carbon monoxide concentration of the reformed gas to be lower than a predetermined value from the start of its operation. Hence, a high-quality reformed gas which can be supplied even to a polymer electrolyte fuel cell can be obtained with minimizing the loss of hydrogen due to the side reactions. Further, as will become apparent from the disclosure of the embodiment, as the activating temperature required for ensuring sufficient initial activity of the carbon monoxide removing catalyst is reduced compared with the case of providing only an inactive gas not containing hydrogen, the energy consumption can be restricted.

Further, the gas having such composition provides a unique advantage of being usable also as a gas to be supplied for reduction of the catalyst in the methanol reformer disposed upstream of the carbon monoxide remover. Therefore, it is possible to effect simultaneously and continuously both the reduction of the methanol reforming catalyst and the activation of the carbon monoxide removing catalyst. And, in providing any necessary facilities for the activating process as a pre-treatment of the fuel reforming apparatus before its use, it becomes unnecessary to provide separately e.g. a reducing facility and material for the methanol reforming catalyst and a pre-treatment facility and material for the carbon monoxide removing catalyst.

Here, if the carbon monoxide removing catalyst is activated with the hydrogen-containing inactive gas at from 80 to 250° C., the concentration of carbon monoxide present in the reformed gas can be reduced to be less than 100 ppm (see FIGS. 3 through 5 and Table 2). Further, if the carbon monoxide concentration is reduced to such level, it is possible to obtain the reformed gas which can be supplied to the solid polymer fuel cell from the beginning of the operation of the carbon monoxide remover. Further, if the activation is effected at a temperature from 120 to 250° C., it is possible to reduce the carbon monoxide concentration to be lower than 10 ppm (see FIGS. 3 through 5 and Table 2). If the carbon monoxide concentration is reduced to such level, this will provide an effect of significantly restricting the poisoning of the electrode catalyst of the fuel cell with carbon monoxide, thereby to extend the service life of the electrode catalyst.

DETAILED DESCRIPTION OF THE INVENTION

In the following discussion, construction of a carbon monoxide removing catalyst and a carbon monoxide removing method using the catalyst both relating to the present invention will be described by way of example of a polymer electrolyte fuel cell system for generating electric power by using a reformed gas.

Figure 1:
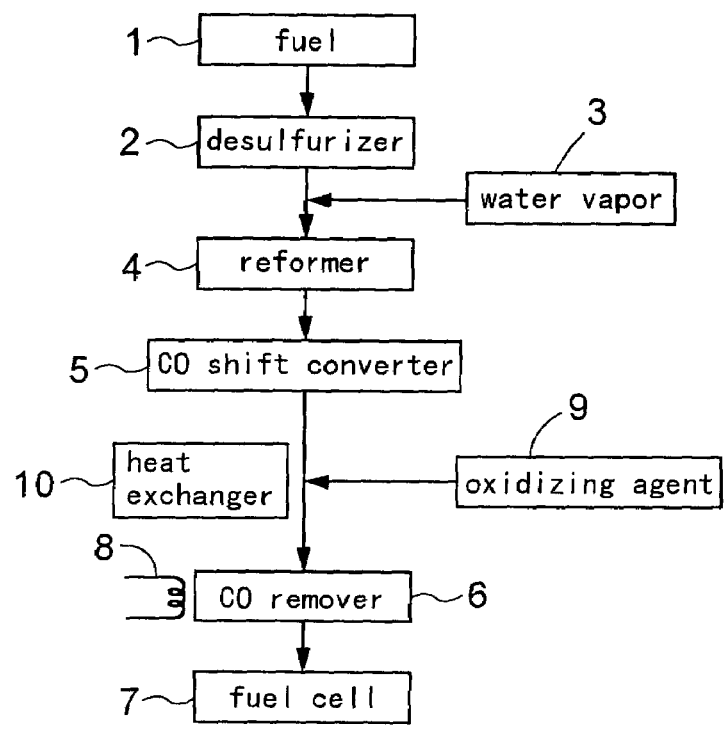
FIG. 1 is a conception diagram of a fuel cell system in which the present invention may be embodied.

FIG. 1 is a block diagram of a fuel reforming system which operates to produce from a raw fuel of natural gas (city gas) a reformed gas containing hydrogen as the major component thereof and then to remove carbon monoxide contained in the reformed gas and supply this reformed gas to a fuel cell for electric power generation. Specifically, the system comprises a pipe (made of e.g. stainless steel)-connected assembly of a raw fuel supplying line 1 receiving the natural gas as the raw fuel, a desulfurizer 2 accommodating a desulfurizing catalyst, a desulfurizing agent and so on, a reformer 4 accommodating a reforming catalyst, a carbon monoxide shift converter 5 accommodating a carbon monoxide shift converting catalyst, and a carbon monoxide remover 6 accommodating a carbon monoxide removing catalyst (e.g. comprising a support of alumina and ruthenium supported thereon). The reformed gas reformed by its passage through this fuel reforming system comprises a gas containing hydrogen as its major component thereof. And, this gas is supplied to a polymer electrolyte fuel cell 7 for electric power generation. Incidentally, in the present application, the system extending from the raw fuel supplying line 1 to the polymer electrolyte fuel cell 7 is generically referred to as the uel cell system Here, the raw fuel supplying line 1 is connected to a gas cylinder or gas pipe for receiving a predetermined raw fuel. Further, the desulfurizer 2 removes sulfur content contained in the raw fuel. The gas exiting the desulfurizer 2 is mixed with a water vapor supplied from a water vapor generator 3 and then transported to the reformer 4, in which the gas is caused to contact the reforming catalyst so that the hydrocarbons present in the raw fuel will be reformed mainly into hydrogen and also into carbon monoxide and carbon dioxide as byproducts. The reformed gas thus obtained is rich in hydrogen, but still contains about ten and a few % of carbon monoxide as the byproduct. Therefore, the gas with this composition cannot be supplied directly to the polymer electrolyte fuel cell 7. Then, at the carbon monoxide shift converter 5, the gas is caused to contact its carbon monoxide shift converting catalyst such as copper-zinc type catalyst, whereby the carbon monoxide present in the gas is converted into carbon dioxide and the concentration of carbon monoxide is reduced to about 0.5 to 1%.

Further, this reformed gas whose carbon monoxide concentration has been reduced to 0.5 to 1% is mixed with air (its oxygen acts as an oxidizer) supplied from an oxidizing agent supplier 9 and this mixture gas is introduced as a reaction gas via the pipe into the carbon monoxide remover 6. This carbon monoxide remover 6 is constructed such that a catalyst layer 12 comprising the carbon monoxide removing catalyst is accommodated in its housing for allowing passage of the reaction gas through the catalyst layer 12.

Figure 2:
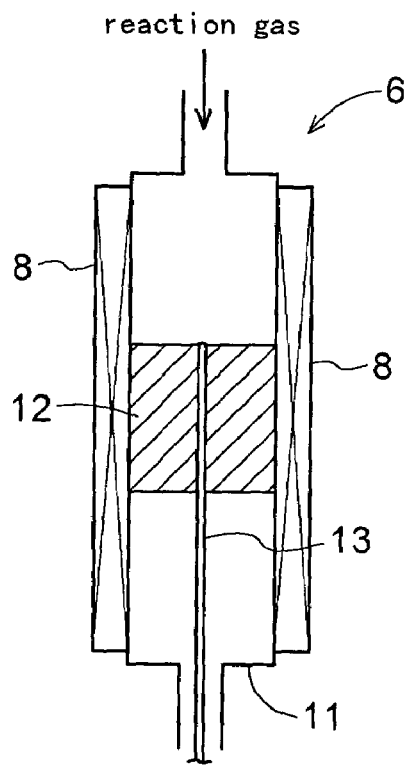
FIG. 2 is a construction diagram of a carbon monoxide remover.

FIG. 2 shows the construction of the carbon monoxide remover 6.

This carbon monoxide remover 6 includes the catalyst layer 12 disposed inside a reaction tube 11 made of SUS and charged with the carbon monoxide removing catalyst, a heater or a heat source for heating the SUS reaction tube 11 as the housing, and a temperature adjusting means 8 disposed along the outer periphery of the SUS reaction tube 11 and having a cooling unit for cooling this SUS reaction tube 11. The temperature of the catalyst layer 12 is monitored by a temperature monitoring means 13 comprised of e.g. a thermocouple and as the temperature adjusting means 8 operates based on its monitor result, the temperature of the catalyst layer 12 is adjusted. Incidentally, as shown in FIG. 2, the temperature monitoring means 13 is disposed so as to extend through the catalyst layer 12 from its upstream side for receiving the reaction gas to its downstream side, so that the temperature of a desired portion from the upstream side to the downstream side of the catalyst layer 12 can be determined by using the thermocouple. And, by determining the temperatures of the respective portions by moving the thermocouple from the upstream side to the downstream side, the maximum temperature of the catalyst layer 12 can be determined. Further, a mechanism may be provided which is capable of monitoring and adjusting not only the temperature of the catalyst layer 12 but also the temperature of the reaction tube 11. In this case, the monitoring means 13 may be disposed at the interface between the catalyst layer 12 and the reaction tube 11. The temperature of the reaction tube 11 described below is the temperature of a portion of this reaction tube 11 which portion corresponds to a mid portion (in the middle between the upstream end and the downstream end) relative to the catalyst layer 12.

For example, in order to restrict degradation of the activity due to adherence of iron-containing compound such as iron carbonyl or metalic iron entering the catalyst layer 12 to the carbon monoxide removing catalyst surface and also to restrict the side reactions such as methanation of carbon dioxide, the temperature adjusting means 8 makes adjustment such that the maximum temperature of the catalyst layer 12 may range between 130° C. and 180° C.

The reformed gas whose carbon monoxide concentration has been reduced to 0.5 to 1% is caused to enter, together with the oxidizer, the housing of the carbon monoxide remover 6, in which the gas is caused to contact the catalyst layer 12 accommodated inside this housing. The catalyst layer 12 includes a carbon monoxide removing catalyst, such that mainly through the catalytic reaction of this carbon monoxide removing catalyst, carbon monoxide reacts with oxygen to be oxidized into carbon dioxide. In this manner, the carbon monoxide present in the reformed gas is removed and consequently supplied to the polymer electrolyte fuel cell 7 for electric power generation.

Further, along the outer wall face of some or all of the pipe interconnecting the carbon monoxide shift converter 5 and the carbon monoxide remover 6, there is disposed a heat exchanger 10, so that a heat transfer medium (such as air, water or the like) can flow within the heat exchanger via the wall surface of the pipe to be heat-exchangeable with the reformed gas or the reaction gas. The disposing position of this heat exchanger 10 may be before the position where the oxidizer is added to the reformed gas as shown in FIG. 1 or may also be at a position where the oxidizer has already been added to the reformed gas and this is flowing as the reaction gas or even at a position even more downstream. With occurrence of heat exchange between the heat transfer medium flowing within the heat exchanger 10 and the reformed gas or reaction gas flowing within the pipe, the reformed gas or reaction gas will be cooled. Hence, by appropriately adjusting e.g. the flow rate of the heat transfer medium after determining in advance e.g. the flow rate, temperature of the reformed gas or reaction gas to enter the pipe, the temperature of the gas flowing from the portion where the heat exchanger 10 is disposed to the downstream side in the pipe is adjusted to be 100° C. or lower, preferably, lower than 80° C., with consideration to e.g. possible load variation. Incidentally, the temperature (lower limit) of the reaction gas will be determined, based on such factors as the installing environment of the carbon monoxide remover 6, the temperature of the heat medium employed.

As described hereinbefore, by implementing at least either of the above-described methods, i.e. the method of adjusting the temperature of the catalyst layer 12 to be higher than 130° C. and lower than 180° C. or the other method of adjusting the temperature of the pipe contacting the upstream portion of the carbon monoxide remover 6 to a temperature of 100° C. or lower, iron poisoning of the carbon monoxide removing catalyst can be significantly restricted, thereby to improve the service life and the activity of the carbon monoxide removing catalyst. Further, if these methods are implemented together, with the resultant multiplier effect thereof, the service life and the activity of the carbon monoxide removing catalyst may be even more improved.

Moreover, by providing a drain trap in the pipe to allow condensation of the steam present in the reaction gas introduced into the carbon monoxide remover 6 and setting the dew point of the reaction gas at 60° C. or lower, preferably 40° C. or lower under the processing pressure, then, it becomes possible to avoid dew formation within the pipe or the carbon monoxide remover.

Next, a method of preparing the carbon monoxide removing catalyst will be described.

First, a γ-alumina support in the form of a sphere of 2-4 mm diameter was soaked in an aqueous solution of ruthenium trichloride to allow supporting of the ruthenium thereon by the impregnation method. After its drying, this was soaked in an aqueous solution of sodium carbonate and then washed with water and dried, whereby a precursor was obtained. This precursor was soaked in hydrazine solution to reduce the ruthenium present on the surface of the precursor and then water-washed again. After this was dried at 105° C., a ruthenium/alumina catalyst was obtained. It was observed that the supported ruthenium a was accumulated in the thickness of a few tens of μm to a few hundreds of μm and inside the catalyst most of the ruthenium atoms were present in the form of metal ruthenium, but in the vicinity of its surface, ruthenium compounds such as oxides, chlorides, hydroxides, or the like of ruthenium were co-present with the metal ruthenium. Here, the supporting amount of ruthenium to be supported on the support is preferably 0.1 to 5 wt. %, more preferably 0.5 to 2 wt. %. Incidentally, although alumina was employed as the support in the present embodiment, other supports such as of silica, titania, zeolite, etc. may also be employed.

8 cc of the above-described ruthenium/alumina catalyst (carbon monoxide removing catalyst) was charged into a stainless steel reaction tube (housing) 11 having an inner diameter of 21.2 mm and incorporating therein a thermocouple inserting sheath pipe having an outer diameter of 6 mm, thereby to obtain the carbon monoxide remover 6. In operation, the gas introduced from the entrance of this carbon monoxide remover 6 will pass through the catalyst layer 12 and then be discharged from its exit to the outside of the housing.

Incidentally, with the catalysts to be employed in such fuel cell system, each catalyst is activated before the construction of the above-described fuel cell system. Specifically, the catalysts incorporated respectively in the carbon monoxide shift converter 5 and the carbon monoxide remover 6 will each be subjected to the treatment required for its activation. Then, by shutting off introduction of atmosphere and under this condition, each catalyst is connected with the pipe, thereby to be incorporated within the fuel cell system.

For instance, if the catalysts to be incorporated in the carbon monoxide shift converter 5 and the carbon monoxide remover 6 are to be reduced and activated by different gases, then, the carbon monoxide shift converting catalyst incorporated in the carbon monoxide shift converter 5 will be reduced according to the standard method by being heated to a temperature below 260° C. with introduction of the gas mixed with 10 volume % or less of hydrogen gas. On the other hand, the carbon monoxide removing catalyst incorporated in the carbon monoxide remover 6 will be activated by the invention activating method, i.e. by using at least one kind of inactive gas selected from the group consisting of nitrogen gas, helium gas, argon gas and carbon dioxide gas or the hydrogen-containing inactive gas consisting of less than 50 volume % of hydrogen gas and the remaining volume of inactive gas.

Preferably, the activating step is effected in the range of 80 to 400° C. Further, in the case of the activation of the carbon monoxide removing catalyst, the activating step is effected, preferably, in the range from 120 to 250° C. Moreover, in the case of the activation with the hydrogen-containing inactive gas consisting of less than 10 volume % of hydrogen gas and the remaining volume of inactive gas, the activating step of the carbon monoxide removing catalyst is effected, preferably, at 80 to 250° C., more preferably, at 120 to 250° C.

Alternaively, according to this method, the gas used for the reduction of the carbon monoxide shift converting catalyst can be used as it is for the activation of the carbon monoxide removing catalyst as well.

Namely, under the condition of the carbon monoxide shift converter 5 and the carbon monoxide remover 6 being connected with each other via the pipe, by maintaining the carbon monoxide shift converter 5 and the carbon monoxide remover 6 under the temperature suitable for the respective reduction and activation thereof with introduction of the hydrogen-containing inactive gas consisting of less than 10 volume % of hydrogen gas and the remaining volume of inactive gas., their reducing operation and the activating operation both can be carried out. With this, the operations are possible with only one kind of activating (reducing) gas.

Incidentally, the reasons why the upper limit value for the ratio (volume %) of the hydrogen to be contained in the hydrogen-containing inactive gas for activating the carbon monoxide removing catalyst at less than 50 volume % are as follows. Firstly, if the carbon monoxide removing catalyst is to be activated by using a gas containing hydrogen as the major component thereof, a large amount of hydrogen gas of a high concentration will be required for the sole purpose of activation of the carbon monoxide removing catalyst, hence being troublesome. Secondly, when this gas used in this activating process is discharged out of the system, there is the risk of the hydrogen concentration becoming the explosion limit range (4 to 75 volume %) of hydrogen. Hence, an after-treatment will be required.

Next, for the case of effecting the above-described activating treatment (pre-treatment) and the further case of not effecting the treatment, results of determinations on the carbon monoxide removing abilities of those carbon monoxide removers 6 based on variations in the carbon monoxide concentrations at the entrance and the exit of these carbon monoxide removers 6 will be discussed next. For the determination of the carbon monoxide removing abilities, a simulated reaction gas containing hydrogen, carbon monoxide and others was supplied to each carbon monoxide remover 6 and the outlet gas (exit gas) was sampled over time at the exit of the carbon monoxide remover 6 and the concentration of the carbon monoxide in this exit gas was determined by using a gas chromatograph apparatus including a thermal conductivity detector (TCD) and a hydrogen flame ionization detector (FID). Incidentally, the detectable lower limit for carbon monoxide of this gas chromatograph apparatus was 5 ppm in Examples 1-4 and Comparison Examples 1-3 and 1 ppm in the other Examples and other embodiments.

EXAMPLE 1

As described hereinbefore, a carbon monoxide remover 6 was prepared by charging, into a stainless steel reaction tube 11, 8 cc of Ru/alumina catalyst (carbon monoxide removing catalyst) including a support of an alumina sphere of a diameter of 2 to 4 mm and ruthenium (Ru) supported on this support. This carbon monoxide remover 6 include a temperature adjusting means 8 having a heater capable of heating the reaction tube 11 from the outside and a cooler capable of cooling the tube, so that the temperature of the reaction tube 11 is controllable.

Then, while introducing the hydrogen-containing inactive gas (hydrogen: 6%, nitrogen: 94%) for activating the carbon monoxide removing catalyst at the flow rate of 1000 cc/min. to this carbon monoxide remover 6 (the ruthenium supporting amount of the carbon monoxide removing catalyst: 1.0 wt. %), the remover was heated by the temperature adjusting means until the reaction tube temperature reached 250° C. and was maintained at 250° C. for 1.5 hours (pre-treatment).

Figure 3:
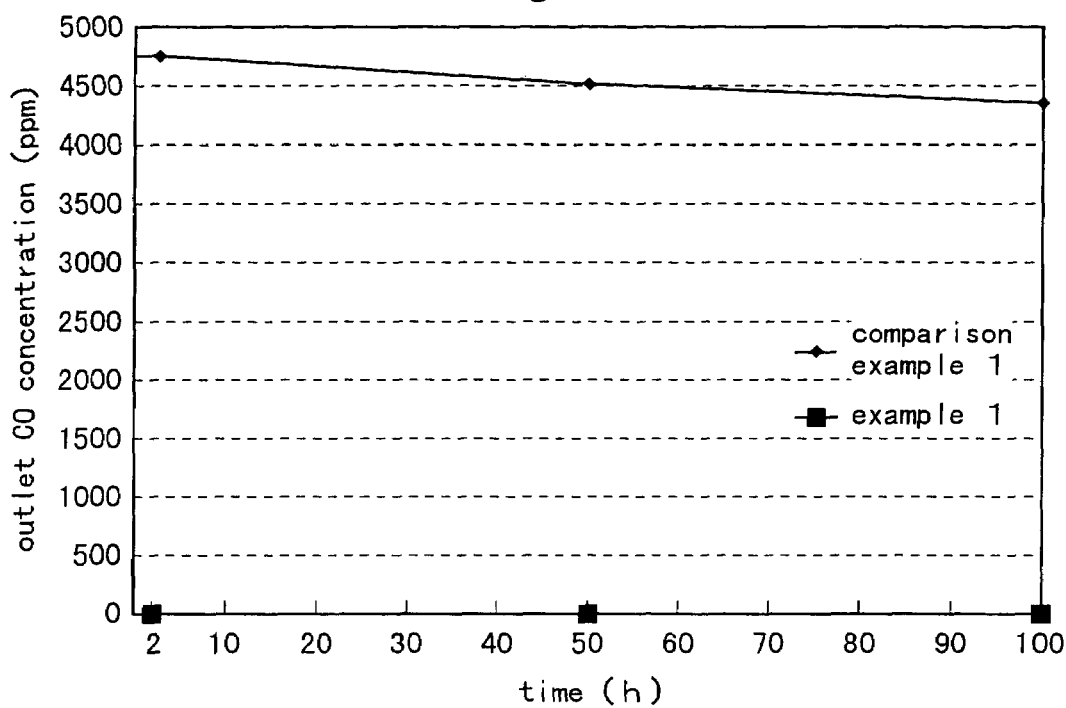
FIG. 3 is a graph showing effect of the embodiment of the present invention.

After this pre-treatment, the temperature of the reaction tube 11 was lowered to 100° C. and maintained at 100° C., and the simulated reaction gas was introduced into the reaction tube 11 at space velocity (GHSV): 7500/h, thereby to allow an oxidation removal for carbon monoxide to take place. Incidentally, the simulated reaction gas employed was a gas having a composition (i.e. carbon monoxide: 0.5%, methane: 0.5%, carbon dioxide: 20.9%, oxygen: 0.8%, nitrogen: 3.1%, water (vapor): 5% and balanced with hydrogen) corresponding to the outlet gas from the carbon monoxide shift converter 5 mixed with air to obtain an oxygen/carbon monoxide molar ratio of 1.6. FIG. 3 shows the exit (outlet) carbon monoxide concentration (determined by the gas chromatograph apparatus) obtained when the oxidation removal was effected in the above-described manner.

EXAMPLE 2

While introducing the hydrogen-containing inactive gas (hydrogen: 10 volume %, nitrogen: 90 volume %) for activating the carbon monoxide removing catalyst at the flow rate of 1000 cc/min. to the carbon monoxide remover 6 (1.0 wt. % for the ruthenium supporting amount of the carbon monoxide removing catalyst), the remover was heated by the temperature adjusting means until the reaction tube temperature reached 200° C. and was maintained at 200° C. for 2 hours (pre-treatment).

Figure 4:
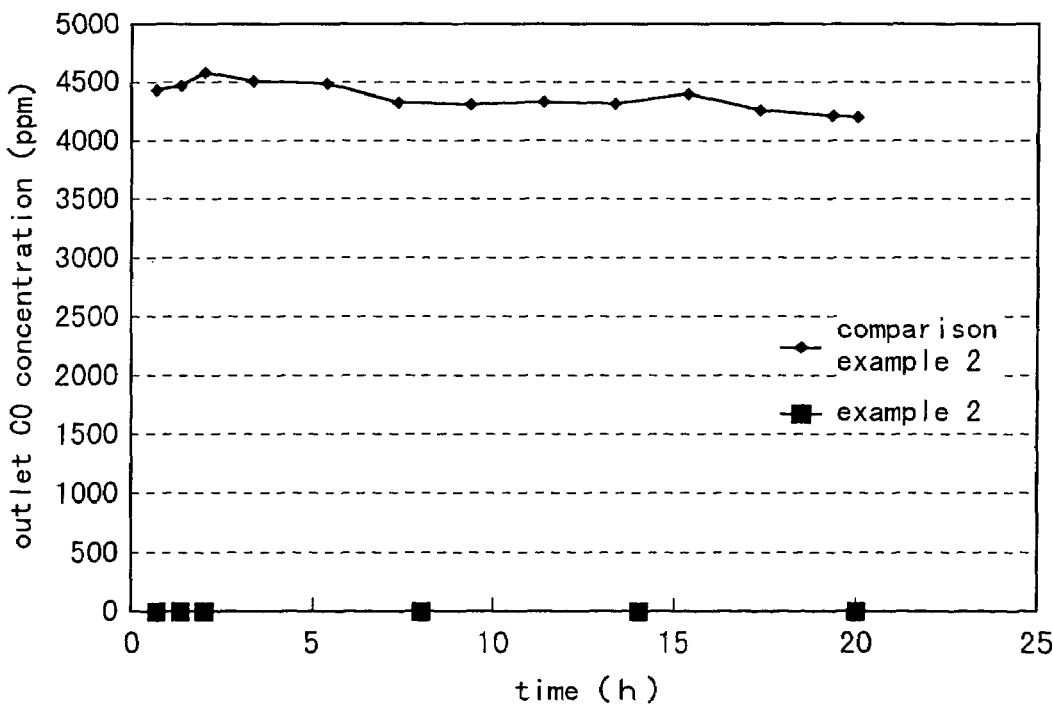
FIG. 4 is a graph showing effect of the embodiment of the present invention.

After this pre-treatment, the temperature of the reaction tube 11 was lowered to 110° C. and maintained at 110° C., and the simulated reaction gas was introduced into the reaction tube 11 at space velocity (GHSV): 7500/h, thereby to allow an oxidizing removing reaction for carbon monoxide to take place. Incidentally, the simulated reaction gas employed was a gas having a composition (i.e. carbon monoxide: 0.5%, methane: 0.5%, carbon dioxide: 20.9%, oxygen: 0.8%, nitrogen: 3.1%, water (vapor): 20% and balanced with hydrogen) corresponding to the exit (outlet) gas from the carbon monoxide shift converter 5 mixed with air to obtain an oxygen/carbon monoxide molar ratio of 1.6. FIG. 4 shows the exit (outlet) carbon monoxide concentration (determined by the gas chromatograph apparatus) obtained when the oxidation removal was effected in the above-described manner.

EXAMPLE 3

Figure 5:
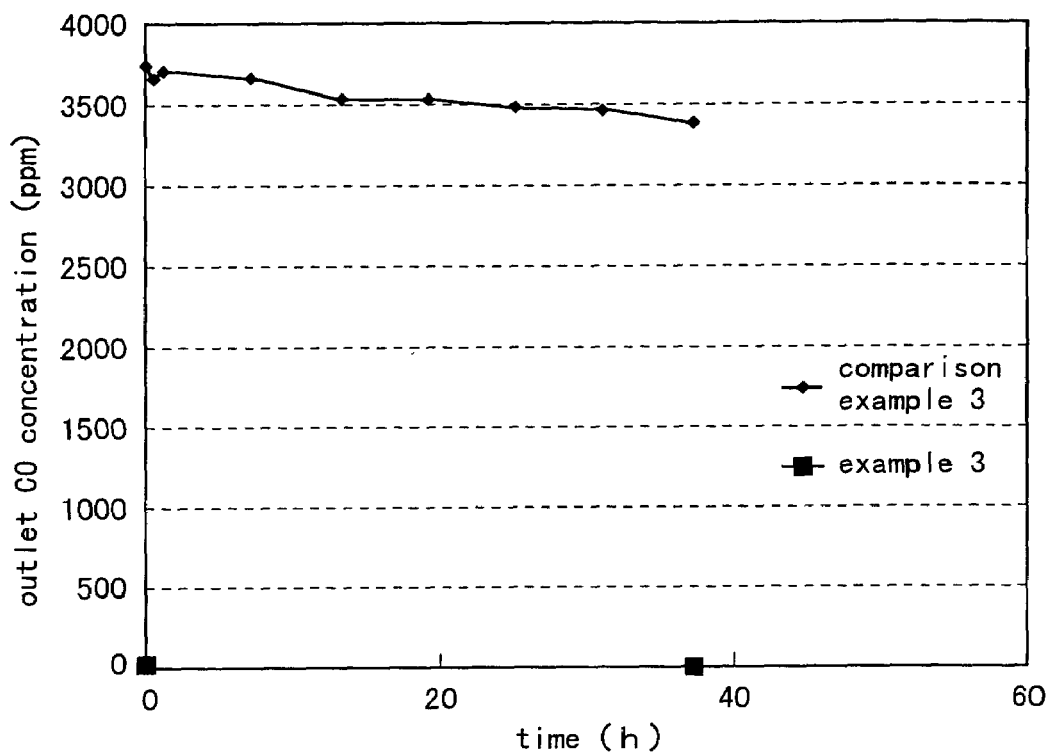
FIG. 5 is a graph showing effect of the embodiment of the present invention.

In this Example 3, by using the carbon monoxide remover 6 (0.5 wt. % for the ruthenium supporting amount of the carbon monoxide removing catalyst), the pre-treatment was effected in the same manner as Example 2, except for setting the oxidation removal temperature for carbon monoxide to 120° C. FIG. 5 shows the exit (outlet) carbon monoxide concentration (determined by the gas chromatograph apparatus) obtained when the oxidation removal was effected in the above-described manner.

Comparison Examples 1-3

Except for absence of the pre-treatment on the carbon monoxide remover 6, as Comparison Examples 1-3, experiments were conducted in the same manner as Examples 1-3 above by effecting the oxidation removal determinations for carbon monoxide with using the simulated reaction gas.

FIGS. 3 through 5 respective show the exit (outlet) carbon monoxide concentrations (determined by the gas chromatograph apparatus) obtained with the oxidation removal described above.

As shown in FIG. 3, with the carbon monoxide remover 6 using the carbon monoxide removing catalyst activated by the invention method, the exit (outlet) carbon monoxide concentration (Example 1) was below the detection limit (5 ppm) and upon start of the operation, there was obtained a reformed gas which can be supplied as a fuel gas to the polymer electrolyte fuel cell, demonstrating the distinguished effect from the activation of the carbon monoxide removing catalyst. On the other hand, in the cases of the absence of the pre-treatment (Comparison Example 1), the exit (outlet) carbon monoxide concentration was 4758 ppm after two hours from the start of operation and still was 4347 ppm after 100 hours, demonstrating that a reformed gas which can be supplied as the fuel gas to the polymer electrolyte fuel cell was not obtained, or even the catalytic reaction hardly proceeded.

Further, as shown in FIGS. 4 and 5, in Examples 2 and 3 also, the exit (outlet) carbon monoxide concentrations were below the detection limit (5 ppm) and even under low temperature conditions of 100 to 120° C., there was obtained a reformed gas which can be supplied as the fuel gas to the polymer electrolyte fuel cell. On the other hand, in the case of the conventional method (Comparison Examples 2 and 3) not effecting the pre-treatment, the catalytic activity was hardly achieved at the initial stage of operation and under a low temperature operation condition, carbon monoxide of about 4000 ppm was contained in the exit gas.

EXAMPLE 4

The gaseous species and the treatment temperature to be used in the pre-treatment were studied.

A carbon monoxide removing catalyst (ruthenium supporting amount: 1.0 wt. %) charged in the carbon monoxide remover 6 was maintained at 80 to 250° C. under the presence of the flow of nitrogen gas as an inactive gas which does not react with the carbon monoxide removing catalyst or nitrogen gas containing 10 volume % of hydrogen (hydrogen-containing inactive gas) and treated under these conditions for 2 hours.

To these, a gas having a composition corresponding to a composition of the exit (outlet) gas from the carbon monoxide shift converter 5 added with air (carbon monoxide: 0.5%, methane: 0.5%, carbon dioxide: 20.9%, oxygen: 0.85%, nitrogen: 3.4%, water (vapor): 20%, and balanced with hydrogen) was introduced at the space velocity (GHSV): 7500/hr. so as to achieve the oxygen/carbon monoxide molar ratio of 1.7. And, with maintaining the reaction tube temperature at 110° C., the oxidation removal for the carbon monoxide was allowed to occur, when the exit (outlet) carbon monoxide concentrations (determined by the gas chromatograph device) were determined. The results are shown in Table 1 and Table 2. Incidentally, in Table 2, any concentration below the detection limit (5 ppm) of the carbon monoxide concentration are all indicated as 5 ppm.

TABLE 1

| pre-treated with $N_2$ gas | | |
|---|---|---|
| pre-treatment temp. (° C.) | 120 | 250 |
| exit CO concentration (ppm) 2 hrs after start of reaction | 39 | 33 |
| exit CO concentration (ppm) 12 hrs after start of reaction | 8 | 9 |

TABLE 2

| pre-treated with 90 volume % $N_2$/10 volume % $H_2$ gas | | | | |
|---|---|---|---|---|
| pre-treatment temp. (° C.) | 80 | 120 | 200 | 250 |
| exit CO concentration (ppm) 2 hrs after start of reaction | 40 | 5 | 5 | 5 |
| exit CO concentration (ppm) 12 hrs after start of reaction | 10 | 5 | 5 | 5 |

The carbon monoxide concentrations of fuel gas which can be directly supplied to a polymer electrolyte fuel cell are from 50 to 100 ppm. Then, the effects of the activating treatments were evaluated whether the concentration reached this level or not. As a result, as shown in Table 1 above, with the activation with nitrogen gas alone, the carbon monoxide could be reduced to the above-described level at 120 to 250° C. Whereas, in the case of the activation with the nitrogen gas containing 10 volume % of hydrogen, as shown in Table 2, the carbon monoxide could be reduced to the above-described level at 80 to 250° C. Especially, when the activation was effected at a temperature higher than 120° C., the carbon monoxide concentration could be reduced to below 5 ppm immediately after the start of the carbon monoxide removal reaction. If a reformed gas refined in this manner is supplied a polymer electrolyte fuel cell, the poisoning of the electrode catalyst can be restricted effectively in particular.

It was found that by effecting the activation under such conditions, from the timing immediately after start of operation of the carbon monoxide remover 6, even in a relatively low temperature range and even with a small amount of oxidizing agent to be added, there still can be obtained a reformed gas which can be supplied directly to the polymer electrolyte fuel cell so that the production efficiency of the reformed gas can be improved advantageously.

In the above, the nitrogen gas containing 10 volume % or less of hydrogen can be used also as a reducing gas typically used for activating (reducing) other catalyst, e.g. the carbon monoxide shift converting catalyst, to be used in the fuel reforming apparatus in which the carbon monoxide remover 6 is to be provided. Therefore, the reducing gas for e.g. the carbon monoxide shift converting catalyst described above can be used also as the gas to be used for the activation of the carbon monoxide removing catalyst.

Next, changes on the surface of the catalyst layer which have occurred as the result of the activating treatment on the carbon monoxide removing catalyst will be studied.

The catalysts employed in this experiment were three kinds of Catalysts A through C (all of which were catalysts prior to the pre-treatment) shown in Table 3 below which were manufactured by the above-described method of preparing making a carbon monoxide removing catalyst, with these catalysts differing in the ratio of ruthenium present in the form of metal (Ru(O)) relative to all forms of the ruthenium Incidentally, the three kinds of Catalysts A through C shown in Table 3 are not to be used directly for the carbon monoxide removal process. Rather, like the case described hereinbefore, they are to be used for the carbon monoxide removal process after undergoing a pre-treatment to be detailed later. Therefore, the values of the ratios of ruthenium in the form of metal shown in Table 3 are values obtained prior to the pre-treatment.

TABLE 3

| | support | Ru supporting amount (%) | BET surface area ($m^2/g$) | CO adsorption amount (cc/g) | pore diameter (mm) | ratio of metal (Ru(O)) (%) |
|---|---|---|---|---|---|---|
| Catalyst A | γ-alumina | 0.98 | 171 | 0.62 | 7.4 | 19.4 |
| Catalyst B | γ-alumina | 0.47 | 170 | 0.33 | 7.7 | 21.0 |
| Catalyst C | γ-alumina | 0.98 | 166 | 1.2 | 7.1 | 11.8 |

Incidentally, in this example, the average pore diameters were determined by the mercury penetration method with using: Autopore II 9220 manufactured by Micromeritics Inc. (Shimadzu Co., Ltd.) In determination, the contact angle between mercury and the measurement sample was set at 130 degrees and the mercury penetrating pressure was varied from $3.447 \times 10^3$ Pa (0.5 psi) to $4.137 \times 10^8$ Pa (60,000 psi). Then, from total pore volume (V) and total pore specific surface area (S) in the range of pore diameter of the carbon monoxide removing catalyst obtained from the above, the average pore diameters (4V/S) were derived. Further, the adsorption amount of carbon monoxide was determined by using a full automatic catalyst gas adsorption amount measuring apparatus (MODEL R6015) manufactured by Ohkura Riken Co., Ltd. and the BET surface area was measured by using a full automatic powder specific surface area measuring apparatus (AMS8000) manufactured by Ohkura Riken Co., Ltd.

Before using the carbon monoxide remover 6 made in the above-described manner for removing carbon monoxide, as a pre-treatment therefor, activating treatment on the carbon monoxide removing catalyst contained within the carbon monoxide remover 6 will be effected by using the inactive gas. By effecting this pre-treatment (activating treatment), the ratio of the metal (O valency) on the surface of the metal acting as a catalyst and supported on the support will increase, so that it may be expected that the catalytic effect will be greater. Next, the results of the experiment will be described with respect to the ratio of the metal (O valency) when the pre-treatment was effected and the resultant carbon monoxide removing effect.

In this example, the ratio of ruthenium present in the form of metal (0 valency) relative to the ruthenium atoms present in the surface of the catalyst was determined by ESCA (Electron Spectroscopy for Chemical Analysis). This ESCA is referred to also as X-ray photoelectron spectroscopy (XPS). This method can identify not only the elements contained in a sample, but also the bonding conditions among these elements from the resultant photoelectron spectrum. Further, of those photoelectrons generated by the irradiation of X ray on the sample, those photoelectrons which can escape from the sample to the outside are photoelectrons which were generated at a position shallower than a predetermined depth. Hence, the determined elements are only those elements present on the surface layer of the sample. In this example, on the γ-alumina as the support, ruthenium is supported in the thickness of about a few tens of μm to a few hundreds of μm of the sample. The ESCA method determines only to the limited depth of a few tens of μm. Therefore, the surface layer portion determined by the ESCA can be considered as ruthenium which mainly acts as the catalyst. Incidentally, the ratio between ruthenium atoms present under the 0 valency condition (condition of metal) determined by the ESCA method and ruthenium atoms present under the other conditions (in the conditions of oxide, chloride, hydroxide, etc.) was obtained through spectrum separation, thereby to obtain the ratio of the ruthenium present in the form of metal.

In this example, the ESCA determination was made by using PHI 5700ESCA System manufactured by PHI Ltd. (Physical Electronics Industries, Inc.). The determination conditions are as shown in Table 4 and Table 5 below.

TABLE 4

| X ray parameters | |
|---|---|
| Source | Standard |
| anode material | Mg (magnesium) |
| anode energy | 1253.6 eV |
| anode power | 400 W |
| anode voltage | 14 kV |
| work function | 3.9 eV |

TABLE 5

| detector parameters | |
|---|---|
| detector | multi-channel |
| input lens | omni-focus |
| lens area | minimum |
| measuring range | 800 μmφ |

(pre-treatment)

For activating the above-described carbon monoxide removing catalysts: Catalysts A through C, while introducing the hydrogen-containing inactive gas (hydrogen: 9.5 volume %, nitrogen: 90.5 volume %) at the flow rate of 1000 cc/min. into the carbon monoxide removers 6 including these catalysts, the temperature of the reaction tube was adjusted to 100° C., 180° C. or 220° C. and then maintained at these respective temperatures for 1.5 hours by the temperature adjusting means 8. Thereafter, while introducing nitrogen gas into the carbon monoxide removers 6, the temperature of the respective catalyst layer 12 was lowered to 70° C., thereby to prevent ruthenium present in the form of metal on the surface layer of the catalyst layer 12 from being affected by e.g. oxidizing effect. Then, the carbon monoxide removal performance was determined. Incidentally, in the above case, the hydrogen-containing inactive gas used in the pre-treatment contains 10 volume % or less of hydrogen (9.5 volume %) like the foregoing case, it is also possible to carry out substantially same pre-treatment with using an inactive gas not containing hydrogen or other hydrogen-containing inactive gas consisting of not more than 50 volume % of hydrogen gas and the remaining ratio of inactive gas, if a predetermined treatment temperature and/or period is appropriately selected. For instance, if the treatment temperature is raised or if the ratio of hydrogen contained in the hydrogen-containing inactive gas is increased, the treatment period may be shorter. Alternatively, if the treatment temperature is lowered or if the ratio of hydrogen contained in the hydrogen-containing inactive gas is decreased, the treatment period may be extended.

EXAMPLE 5

In this Example 5, Catalyst A was charged into the reaction tube 11 to form the catalyst layer 12. Then, the pre-treatment was carried out under the conditions shown in Table 6 below or the pre-treatment was not carried out, thereby to obtain carbon monoxide removers 6 (A1 through A5) having different ratios of ruthenium present in the form of metal in the surface portion of the ruthenium catalyst. On these, the carbon monoxide removing characteristics were studied. Incidentally, for A3 which did not undergo the pre-treatment with the hydrogen-containing inactive gas (hydrogen: 9.5 volume %, nitrogen: 90.5 volume %), the temperature of the catalyst was raised to 70° C. while introducing hydrogen gas (1000 cc/min.) thereto and the catalyst was maintained under this condition for 1 hour with continued introduction of the hydrogen gas, thereby to allow the carbon monoxide removing reaction to take place. Similarly, for A4, the temperature was raised to 70° C. while introducing simulation gas (carbon monoxide; 0.5 volume %, methane: 0.5 volume %, carbon dioxide: 21 volume %, and hydrogen for the rest) simulating the gas from the exit of the carbon monoxide shift converter 5 (1000 cc/min.), thereafter, the carbon monoxide removing reaction was allowed to occur. Also, for A5, the temperature of the catalyst was raised to 70° C. while introducing nitrogen gas (1000 cc/min.) and then the carbon monoxide removing reaction was allowed to occur.

Incidentally, for each of the carbon monoxide removers (A1 through A5) made in the above-described manner, the ratio of Ru (ruthenium) present in the form of metal in the surface portion of the catalyst layer of the carbon monoxide removing catalyst prior to the carbon monoxide removing reaction thereof was determined by the ESCA. The results are shown in Table 6 below.

Incidentally, in the graphs of the figures, the discrete determined values are interconnected with a simple approximating curve, the curve segments between the adjacent determined values does not necessarily reflect the present invention with accuracy. For instance, in the graph of A2 shown in FIG. 6, the temperature of the catalyst layer 12 sharply varies in the vicinity of about 120° C. However, if a determination were effected with greater fineness between the temperatures of 100° C. and 120° C. of the catalyst layer 12, it might be possible that the temperature sharply varies in the vicinity of about 100° C. Therefore, it is reasonable to assume that in such temperature range involving sharp change in the determined value, an error may be present to a degree corresponding to the distance between adjacent determined temperatures (about 10° C. to about 20° C.) for the critical temperature when the carbon monoxide concentration at the exit of the carbon monoxide remover 6 is below 10 ppm.

TABLE 6

| catalyst | A1 | A2 | A3 | A4 | A5 |
|---|---|---|---|---|---|
| pre-treatment | YES | YES | NO | NO | NO |
| pre-treatment temp. | 180° C. | 100° C. | | | |
| pre-treatment period | 1.5 hrs. | 1.5 hrs. | | | |
| ratio of metal (Ru (O)) | 68.6% | 51.2% | 31.2% | 28.2% | 25.1% |

Figure 6:
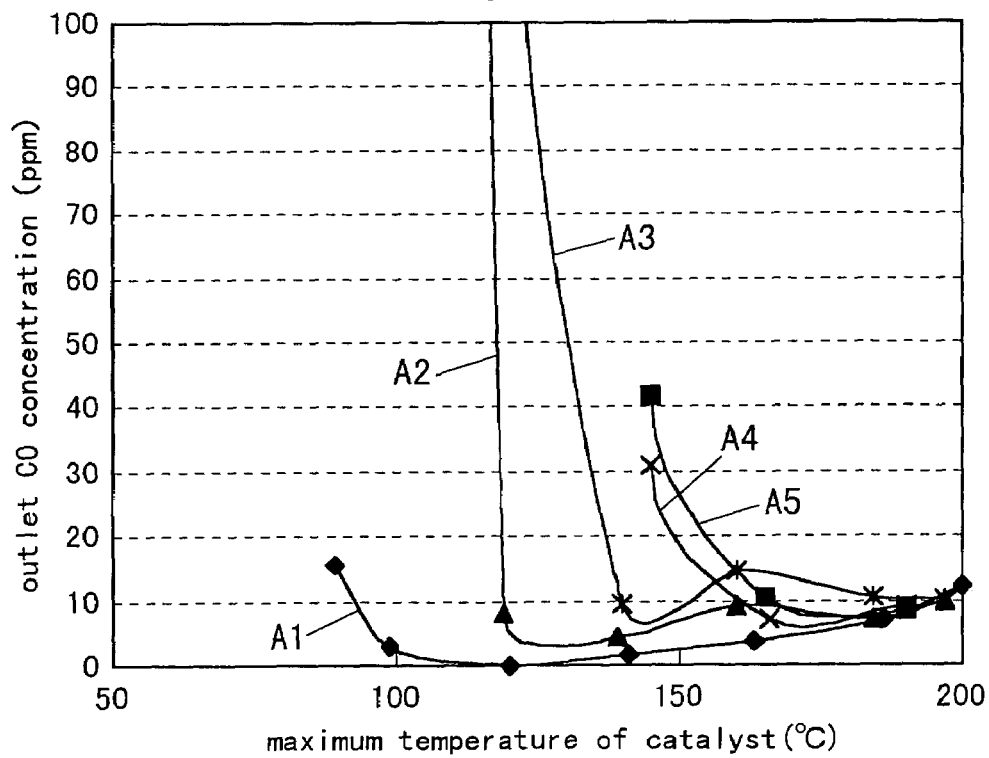
FIG. 6 is a graph illustrating relationship between a temperature of a catalyst layer and a concentration of carbon monoxide for each ratio of presence of ruthenium (Catalyst A)

FIG. 6 shows the results of carbon monoxide removal reactions with the carbon monoxide removers 6: A1 through A5 with introduction of a simulated reaction gas. From this FIG. 6, it can be seen that the greater the ratio of ruthenium in the form of metal (Ru(O)), the greater the carbon monoxide removing effect. In this, the vertical axis of the graph represents the carbon monoxide concentration (ppm) at the exit of the carbon monoxide remover 6, while the horizontal axis represents the maximum temperature (° C.) of the catalyst layer 12. As shown, in the case of the greater ratios of ruthenium in the form of metal (A1, A2), the carbon monoxide can be reduced to 10 ppm or lower in the temperature range of the catalyst layer 12 between about 100° C. to about 180° C. (especially, from about 120° C. to about 180° C.) which range is believed to be desirable in terms of the activity of the catalyst as well as restriction of the side reaction. On the other hand, in the case of the lower ratios of ruthenium in the form of metal (A3 through A5), although the carbon monoxide concentration can be reduced to a sufficiently low value of 10 ppm when the maximum temperature of the catalyst layer 12 is higher than about 170° C. However, when the temperature exceeds about 180° C., this will promote the methanation reaction as will be described later. Hence, these catalysts will not be useful.

Here, the "simulated reaction gas" refers to a gas simulating a gas obtained by adding air as an oxidizer to the outlet gas of the carbon monoxide shift converter 5, having a composition of: carbon monoxide: 0.5%, methane: 0.5%, carbon dioxide: 21%, oxygen: 0.75%, nitrogen: 3.0%, and hydrogen for the rest. Such simulated reaction gas was introduced into each carbon monoxide remover 6 at the space velocity (GHSV) of 7500/hr. The composition including its carbon monoxide concentration of the simulated reaction gas is fixed for all examples. Hence, by comparing the carbon monoxide concentrations at the exit, the carbon monoxide removal performances of the respective catalysts can be evaluated. Incidentally, in this example, the simulated reaction gas was introduced into each carbon monoxide remover 6 at the space velocity (GHSV) of 7500/hr. However, the space velocity may vary within the range of 500 to 50000/hr. More preferably, the space velocity is from 1000 to 30000/hr.

The amount of oxygen contained in the air used as the oxidizing agent will be adjusted such that the molar ratio ($O_2$/CO) between carbon monoxide and this oxygen in the simulated reaction gas may be preferably 3 or less, more preferably less than 2 and most preferably 1.5 or less.

Further, as a typical example, the results of the experiments on the carbon monoxide removing catalysts A1 and A4 are shown in Table 7 and Table 8, respectively. As described hereinbefore, from Table 7 and Table 8, it is understood that the methanation reaction is promoted with the increase in the temperature of the catalyst layer 12 and that there is sudden occurrence of the methanation reaction of the carbon dioxide when the maximum temperature of the catalyst layer 12 exceeds about 180° C. With such methanation of carbon dioxide, this will result in disadvantageous consumption of the hydrogen in the simulated reaction gas. Furthermore, as the chain-reaction like progress of methanation of carbon dioxide, there will occur another problem of further increase in the temperature of the catalyst layer 12 due to the reaction heat. Incidentally, in Table 7, concentrations lower than the detection lower limit (1 ppm) for carbon monoxide are all denoted as 0 ppm.

TABLE 7

CO remover 6 (Catalyst A1)

| reaction tube temp. (° C.) | 70 | 80 | 100 | 120 | 140 | 160 | 170 |
|---|---|---|---|---|---|---|---|
| CO concentration (ppm) | 15.7 | 2.9 | 0 | 1.6 | 3.8 | 7 | 12.2 |
| max temp. of catalyst layer (° C.) | 89 | 99 | 120 | 141 | 163 | 186 | 200 |
| $O_2$ Concentration (ppm) | 86 | 0 | 0 | 0 | 0 | 0 | 0 |
| $CH_4$ concentration (ppm) | 5007 | 5057 | 5232 | 5790 | 7508 | 12659 | 18423 |

TABLE 8

CO remover 6 (Catalyst A4)

| reaction tub. temp. (° C.) | 70 | 80 | 100 | 120 | 140 | 160 | 170 |
|---|---|---|---|---|---|---|---|
| CO concentration (ppm) | 5012 | 4938 | 4506 | 41.8 | 10.4 | 8.6 | 12.4 |
| Max temp. of catalyst layer (° C.) | 72 | 83 | 107 | 145 | 165 | 190 | 201 |
| $O_2$ Concentration (ppm) | 7276 | 7078 | 6241 | 84 | 0 | 0 | 0 |
| $CH_4$ concentration (ppm) | 4965 | 4967 | 4967 | 5153 | 6517 | 13985 | 17065 |

Accordingly, based on the confirmation that the methanation reaction of carbon dioxide is promoted when the maximum temperature of the catalyst layer 12 exceeds about 180° C., even if the carbon monoxide concentration at the exit of the carbon monoxide remover 6 can be reduced to be e.g. 10 ppm or lower, it is inappropriate to employ the carbon monoxide remover 6 at such temperature range.

EXAMPLE 6

In this Example 6, Catalyst B was charged into the reaction tube 11 to form the catalyst layer 12. Then, the pretreatment was carried out under the conditions shown in Table 7 below or the pre-treatment was not carried out, thereby to obtain carbon monoxide removers 6 (B1 through B3) having different ratios of ruthenium present in the form of metal (Ru(O)) in the surface portion of the ruthenium catalyst layer. On these, the carbon monoxide removing characteristics were studied. Incidentally, for B3 which did not undergo the pre-treatment with the hydrogen-containing inactive gas (hydrogen: 9.5 volume %, nitrogen: 90.5 volume %), the temperature of the catalyst was raised to 70° C. while introducing simulation gas (carbon monoxide; 0.5 volume %, methane: 0.5 volume %, carbon dioxide: 21 volume %, and hydrogen for the rest) simulating the gas from the outlet of the carbon monoxide shift converter 5 (1000 cc/min.). Then, the carbon monoxide removal performance was determined.

Incidentally, for each of the carbon monoxide removers 6 (B1 through B3) made in the above-described manner, the ratio of Ru (ruthenium) present in the form of metal (Ru(O)) in the surface layer of the carbon monoxide removing catalyst prior to the carbon monoxide removal reaction thereof was determined by the ESCA. The results are shown in Table 9 below.

TABLE 9

| | catalyst | | |
|---|---|---|---|
| | B1 | B2 | B3 |
| pre-treatment | YES | YES | NO |
| pre-treatment temp. | 220° C. | 180° C. | |
| pre-treatment period | 1.5 hrs. | 1.5 hrs. | |
| ratio of metal Ru | 72.4% | 70.2% | 26.9% |

Figure 7:
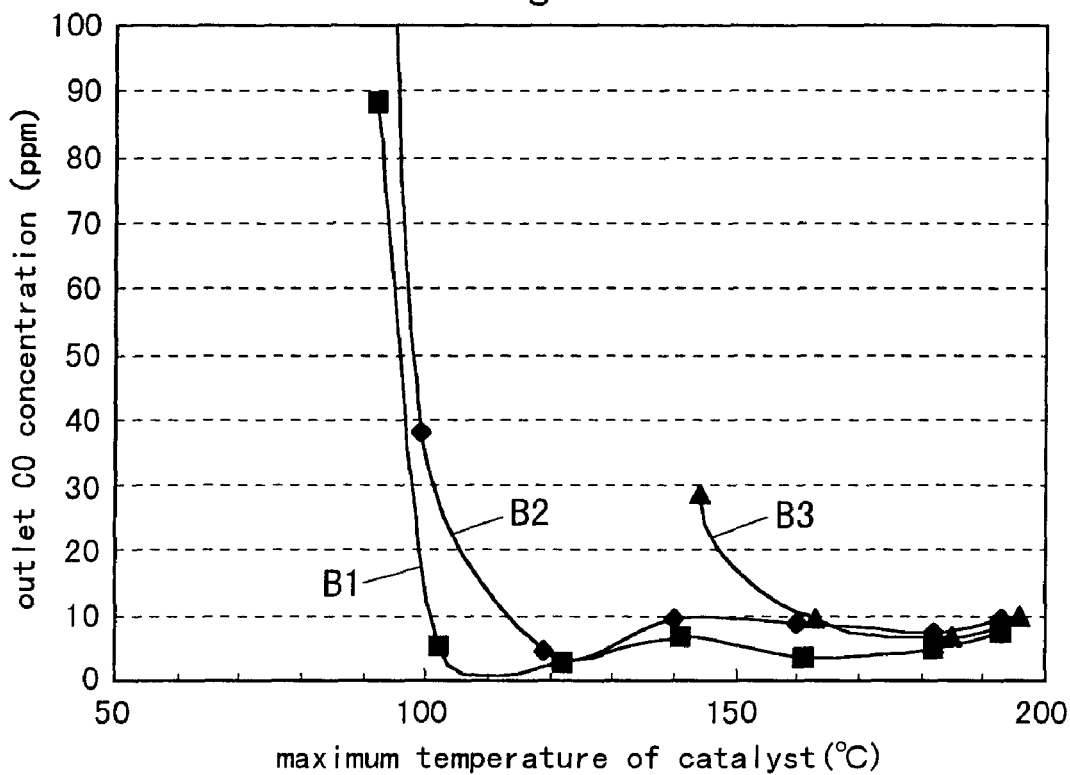
FIG. 7 is a graph showing relationship between a temperature of a catalyst layer and a concentration of carbon monoxide for each ratio of presence of ruthenium (Catalyst B)

FIG. 7 shows the results of carbon monoxide removal reactions effected by the carbon monoxide removers 6: B1 through B3 with introduction of the simulated reaction gas. As shown in FIG. 7, like the case of FIG. 6, it can be seen that the greater the ratio of ruthenium in the form of metal (Ru(O)), the greater the carbon monoxide removing effect. As shown, in the case of the greater ratios of ruthenium in the form of metal (B1, B2), the carbon monoxide can be reduced to 10 ppm or lower in the temperature range of the catalyst layer 12 (temperature range of the maximum temperature of the catalyst layer 12) rage between about 100° C. to about 180° C. (especially, from about 110° C. to about 180° C.) which range is believed to be desirable in terms of the activity of the catalyst as well as restriction of side reaction. On the other hand, in the case of the lower ratio of ruthenium in the form of metal (B3), although the carbon monoxide concentration can be reduced to a sufficiently low value of 10 ppm when the maximum temperature of the catalyst layer 12 is higher than about 160° C. However, when the temperature exceeds about 180° C., this will promote the methanation reaction as described above. Hence, this catalyst will not be useful.

EXAMPLE 7

In this Example 7, Catalyst C was charged into the reaction tube 11 to form the catalyst layer 12. Then, the pre-treatment was carried out under the conditions shown in Table 7 below or the pre-treatment was not carried out, thereby to obtain carbon monoxide removers 6 (C1 through C3) having different ratios of ruthenium present in the form of metal (Ru(O)) in the surface layer of the ruthenium catalyst. On these, the carbon monoxide removing characteristics were studied. Incidentally, for C3 which did not undergo the pre-treatment with the hydrogen-containing inactive gas (hydrogen: 9.5 volume %, nitrogen: 90.5 volume %), the temperature was raised to 70° C. while introducing simulation gas (carbon monoxide; 0.5 volume %, methane: 0.5 volume %, carbon dioxide: 21 volume %, and hydrogen for the rest) simulating the gas from the outlet of the carbon monoxide shift converter 5 (1000 cc/min.). Then, the carbon monoxide removal performance was determined.

Incidentally, for each of the carbon monoxide removers 6 (C1 through C3) made in the above-described manner, the ratio of Ru (ruthenium) present in the form of metal in the surface layer of the carbon monoxide removing catalyst prior to the carbon monoxide removal reaction thereof was determined by the ESCA. The results are shown in Table 10 below.

TABLE 10

| | catalyst | | |
|---|---|---|---|
| | C1 | C2 | C3 |
| pre-treatment | YES | YES | NO |
| pre-treatment temp. | 220° C. | 180° C. | |
| pre-treatment period | 1.5 hrs. | 1.5 hrs. | |
| ratio of metal Ru | 74.7% | 63.4% | 14.6% |

Table 11 through Table 13 show the results of carbon monoxide removal reactions effected by the carbon monoxide removers 6: C1 through C3 with introduction of the simulated reaction gas. Incidentally, in Table 11, the concentrations lower than the detection lower limit (1 ppm) for carbon monoxide are all shown as 0 ppm. As shown in Table 11 through Table 13, like the case of FIG. 6 and FIG. 7, it can be seen that the greater the ratio of ruthenium in the form of metal (Ru(O)), the greater the carbon monoxide removing effect. As shown, in the case of the greater ratios of ruthenium in the form of metal (C1, C2), the carbon monoxide removal reaction can take place sufficiently under such low temperature range of from about 70° C. to about 100° C. On the other hand, in the case of the lower ratio of ruthenium in the form of metal (C3), the carbon monoxide removal reaction hardly occurs in the temperature range from about 70° C. to about 100° C.

TABLE 11

| carbon monoxide remover 6 (Catalyst C1) | | | |
|---|---|---|---|
| reaction tube temp. (° C.) | 70 | 80 | 100 |
| CO concentration (ppm) | 0 | 0 | 0 |
| max temp. of catalyst layer (° C.) | 93 | 103 | 124 |

TABLE 12

| carbon monoxide remover 6 (Catalyst C2) | | | |
|---|---|---|---|
| reaction tube temp. (° C.) | 70 | 80 | 100 |
| CO concentration (ppm) | 2.9 | 1.1 | 3.1 |
| max temp. of catalyst layer (° C.) | 90 | 100 | 121 |

TABLE 13

| carbon monoxide remover 6 (Catalyst C3) | | | |
|---|---|---|---|
| reaction tube temp. (° C.) | 70 | 80 | 100 |
| CO concentration (ppm) | 4867 | 4837 | 2346 |
| max temp. of catalyst layer (° C.) | 72 | 84 | 114 |

As may be understood from Examples 5 though 7 described above, by effecting the pre-treatment for increasing the ratio of ruthenium present in the form of metal (Ru(O)) on the catalyst layer, there is achieved the carbon monoxide remover 6 which can effectively reduce the carbon monoxide concentration without the disadvantageous side reactions such as the methanation reaction of carbon dioxide. For obtaining such carbon monoxide remover 6, the pre-treatment was carried out by causing the hydrogen-containing inactive gas containing 9.5 volume % of hydrogen and the inactive gas to contact the catalyst layer 12. Incidentally, in these examples, the ratio of hydrogen contained in the hydrogen-containing inactive gas employed in the pre-treatment was set as 9.5 volume %. However, with a pre-treatment using other hydrogen-containing inactive gas containing less than 50 volume % of hydrogen and inactive gas, the above-described effect of the pre-treatment can be achieved as well.

In the above, the carbon monoxide removal performances were determined on the samples having different ratios of ruthenium present in the form of metal (Ru(O)) in the surface portion of the catalyst layer. Then, as long as the ratio of ruthenium in the form of metal exceeds about 50% as shown in FIG. 6 and FIG. 7 as well as Tables 6 through 13, it is possible to reduce the concentration of carbon monoxide at the exit of the carbon monoxide remover 6 to a value as low as about 10 ppm or less in the range of maximum temperature of the catalyst layer 12 of from about 100 to about 180. Further, if the ratio of the ruthenium in the form of metal exceeds about 65%, as may be understood from the measurement result on Sample A1 for instance, an even greater carbon monoxide removing effect will appear. Furthermore, if the ratio of the ruthenium in the form of metal exceeds about 70%, as may be understood from the measurement result on Sample C1 for instance, a still greater carbon monoxide removing effect will appear. Incidentally, as shown in Table 6, Table 9 and Table 10, this ratio of ruthenium in the form of metal can be increased by raising the pre-treatment temperature. In this respect, it should be noted, however, that an excessively high pre-treatment temperature is not desirable since this may result in sintering of the catalyst. Also, the ratio of ruthenium present in the form of metal on the catalyst surface can be increased also by extending the period of the pre-treatment.

In order to increase the ratio of ruthenium present in the form of metal (Ru (O)) in the surface portion of the catalyst layer, it is preferred that the activation (pre-treatment) of the carbon monoxide removing catalyst with the inactive gas or with the hydrogen-containing inactive gas containing less than 50 volume % be carried out in the temperature range of from about 80° C. to about 400° C. Then, as described above, more preferred temperature range as the pre-treatment temperature has been found out. Specifically, as shown in Tables 6 through 13 and FIGS. 6 and 7, it was possible to increase the ratio of ruthenium present in the form of metal (Ru(O)) in the surface portion of the catalyst layer by the pretreatment effected at the temperatures higher than 100° C. (e.g. about 100° C. to about 220° C.). In this regard, as described above, the treatment temperature can be varied through adjustment of the amount of hydrogen contained in the hydrogen-containing inactive gas or the treatment period. Accordingly, for the purpose of increasing the ratio of ruthenium present in the form of metal in the surface portion of the catalyst layer, the pre-treatment may be effected at 250° C. or even at 400° C. In such case, the treatment period and/or the amount of hydrogen contained in the hydrogen-containing inactive gas can be reduced. Conversely, in the case of a lower treatment temperature of about 80° C., the above-described pre-treatment is made possible by extending the treatment period and/or increasing the amount of hydrogen contained in the hydrogen-containing inactive gas.

<Other Embodiments>

<1>

In Examples 5 through 7 described above, the gas not containing water vapor was used as the simulated reaction gas. However, even when the simulated reaction gas contains water vapor, similar carbon monoxide removing effect can be achieved. This will be explained next. For making the carbon monoxide remover 6, the Catalyst A described hereinbefore was charged into the reaction tube 11 to form the catalyst layer 12. Then, on this, the pre-treatment was effected at 200° C. for 1 hour with using a hydrogen-containing inactive gas having composition of: hydrogen: 5 volume %, nitrogen: 95%, so that of the ruthenium present in the surface portion of the catalyst layer 12, 69% thereof was present in the form of metal. This was used in this example. The simulated reaction gas employed here had the composition of: carbon monoxide: 0.5%, methane: 0.5%, carbon dioxide: 21%, oxygen: 0.75%, nitrogen: 3.0% and hydrogen for the rest. Then, to 1000 Nml/min of this mixture gas, water vapor was added by 20 volume %, 5 volume % or by 0 volume %. The other measurement conditions were the same as the foregoing examples. Incidentally, the reaction simulation gas was introduced to achieve GHSV value of 7500/hr on the dry basis.

Figure 8:
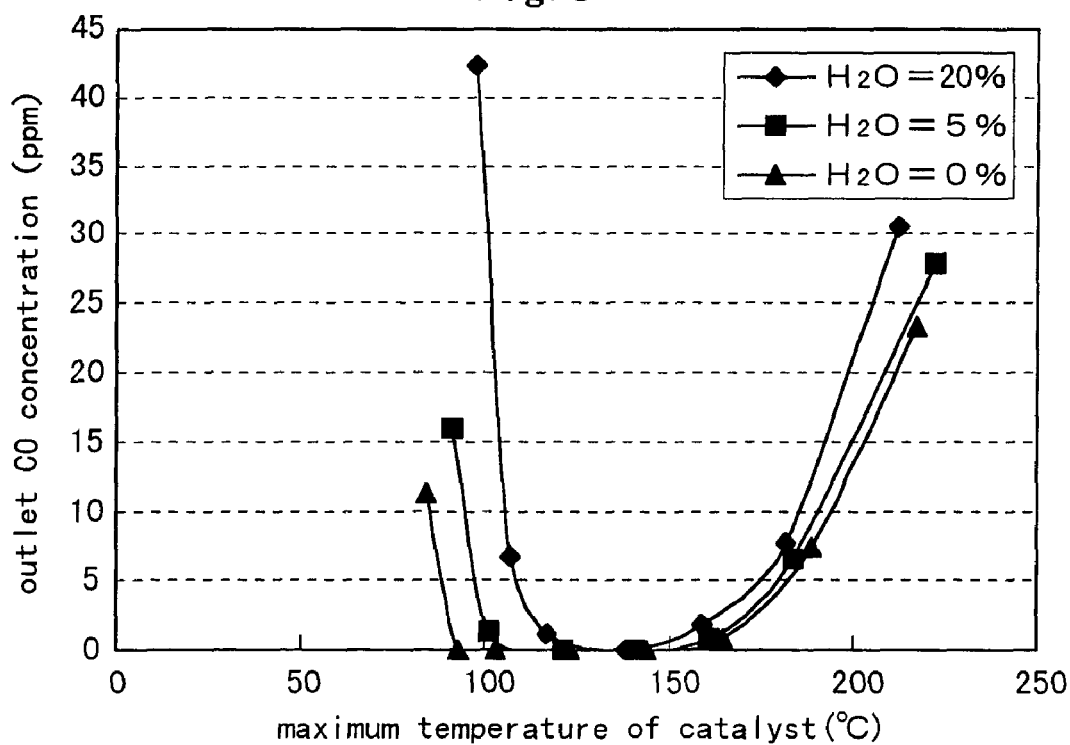
FIG. 8 is a graph showing relationship between a temperature of a catalyst layer and a concentration of carbon monoxide for each ratio of presence of water steam.

As may be understood from the result of measurement of carbon monoxide concentration at the exit of the carbon monoxide remover 6 shown in FIG. 8, the presence of water vapor in the simulated reaction gas does not affect the carbon monoxide removing performance and the carbon monoxide concentration at the exit of the carbon monoxide remover 6 can be reduced to such low value as less than 10 ppm.

<2>

In Examples 5 through 7 described above, after effecting the pre-treatment on the carbon monoxide removing catalyst, the gas present inside the carbon monoxide remover 6 was replaced by nitrogen gas so as to prevent the catalyst layer from being oxidized. In this example, however, after the pre-treatment, the catalyst layer 12 was exposed to air. And, through determination of the carbon monoxide removing performance of the carbon monoxide remover 6 using this catalyst layer 12, it will be demonstrated next that even when the catalyst layer 12 is exposed to air, its performance as the carbon monoxide removing catalyst will hardly be affected and the catalyst can substantially maintain its carbon monoxide removing effect as long as the ratio of ruthenium present in the form of metal is greater than 50%.

(Catalyst A')

Figure 9:
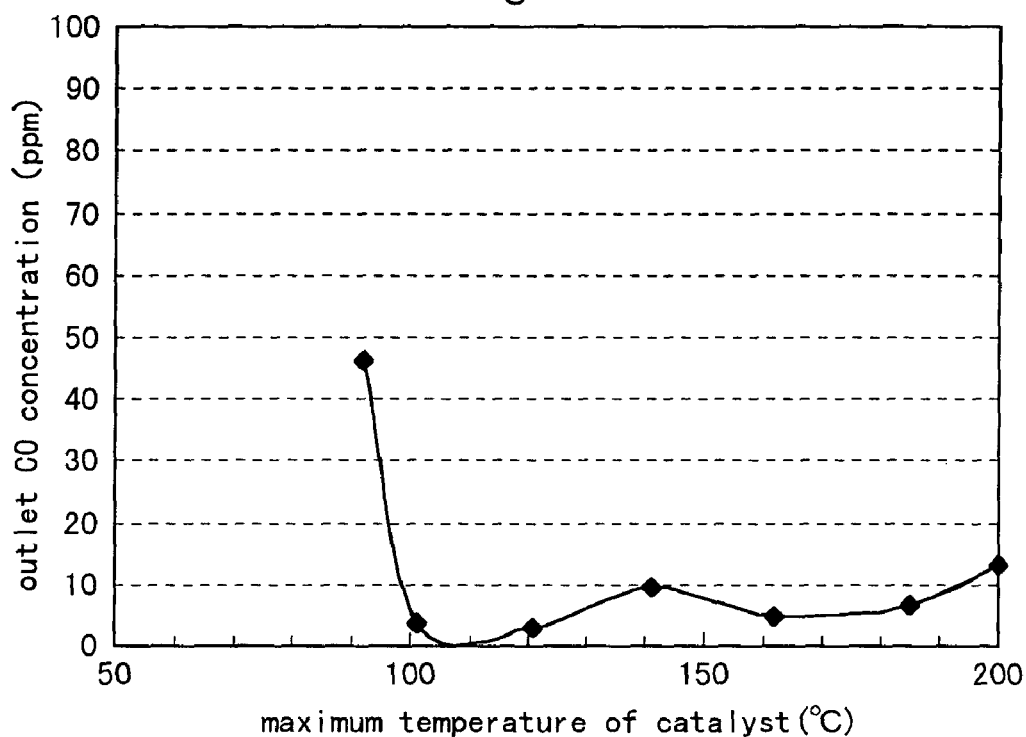
FIG. 9 is a graph showing relationship between a temperature of a catalyst layer and a concentration of carbon monoxide.

For obtaining this Catalyst A' while the hydrogen-containing inactive gas (hydrogen: 9.5%, nitrogen: 90.5%) was introduced at the rate of 1000 cc/min. to the Catalyst A under the conditions shown in Table 3, the temperature of the reaction tube was raised to 220° C. and maintained at this temperature for 1.5 hours by the temperature adjusting means 8, thereby to effect the pre-treatment on the catalyst. Thereafter, while its inside was being replaced by nitrogen gas (flow rate: 1000 cc/min.), the temperature of the catalyst layer 12 of the carbon monoxide remover 6 was lowered to the room temperature and then the nitrogen replacement was stopped. Then, the catalyst layer 12 was exposed to air at the room temperature for 30 hours, whereby the Catalyst A' was obtained. The ratio of ruthenium present in the form of metal in the surface portion of the catalyst layer after its air exposure for 30 hours was 68.3%. Thereafter, like the foregoing examples, while introducing nitrogen gas (1000 cc/min.), the temperature was raised to 70° C. Then, the concentration of carbon monoxide at the exit of the carbon monoxide remover 6 was determined. The other measurement conditions were the same as Examples 5 through 7 described above. The results of determination are shown in FIG. 9. Next, the effect of exposing the catalyst layer 12 will be studied.

FIG. 9 shows that the catalyst layer 12 maintains its effect for reducing the carbon monoxide concentration to the level lower than 10 ppm in the practical temperature range of about 100° C. to about 180° C. Therefore, it may be said that even when the catalyst layer 12 is exposed to air, its carbon monoxide removing performance will not be significantly deteriorated as long as the ratio of ruthenium present in the form of metal (Ru(O)) in the surface portion of the catalyst layer is maintained above 50%.

(Catalyst A")

Figure 10:
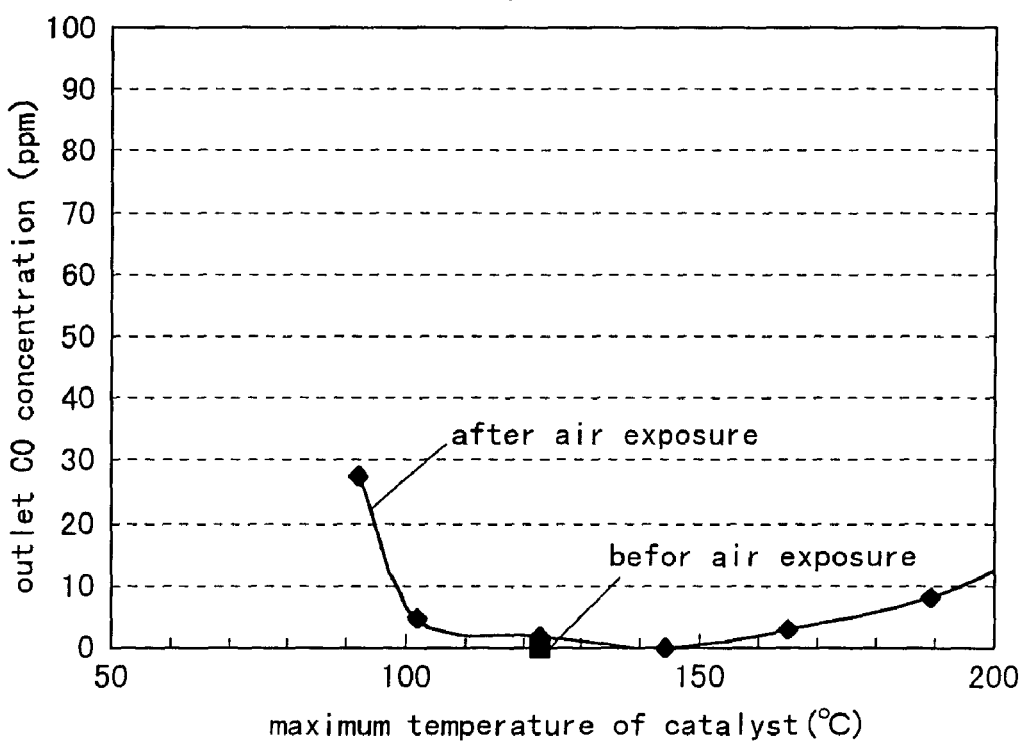
FIG. 10 is a graph showing relationship between a temperature of a catalyst layer and a concentration of carbon monoxide.

In the case of this Catalyst A", on the Catalyst A having the conditions shown in Table 3, the activating treatment was effected by raising the temperature of the reaction tube to 180° C. and maintained at this temperature for 1.5 hours by the temperature adjusting means 8 while introducing the hydrogen-containing inactive gas (hydrogen: 9.5%, nitrogen: 90.5%) at the rate of 1000 cc/min. Then, this was used first for carbon monoxide elimination. In this, the determination of the carbon monoxide concentration at the exit of the carbon monoxide remover 6 was effected when the maximum temperature of the catalyst layer 12 was 123° C. (determination prior to air exposure). Thereafter, while its inside was being replaced by nitrogen gas (flow rate: 1000 cc/min.), the temperature of the catalyst layer 12 of the carbon monoxide remover 6 was lowered to the room temperature and then the nitrogen replacement was stopped. Then, the catalyst layer 12 was exposed to air at the room temperature for 24 hours. The ratio of ruthenium present in the form of metal in the surface portion of the catalyst layer after its air exposure for 24 hours was 59.5%. Thereafter, like the foregoing examples, while introducing nitrogen gas (1000 cc/min.), the temperature was raised to 70° C. Then, the concentration of carbon monoxide at the exit of the carbon monoxide remover 6 was determined (measurement after air exposure). The other measurement conditions were the foregoing examples. The results of determination are shown in FIG. 10. Next, the effect of the above will be studied.

FIG. 10 shows the carbon monoxide removing performance prior to the air exposure and the carbon monoxide removing performance after the air exposure. It is shown that in either case, the catalyst maintains its effect for reducing the carbon monoxide concentration to the level lower than 10 ppm in the practical temperature range of about 100° C. to about 180° C. Therefore, it may be said that even when the catalyst layer 12 is exposed to air, its carbon monoxide removing performance will not be significantly deteriorated as long as the ratio of ruthenium present in the form of metal (Ru(O)) in the surface portion of the catalyst layer is maintained above 50%.

<3>

Next, there will be described results of experiment conducted to study whether deterioration with lapse of time would occur in the carbon monoxide removing catalyst treated with the above-described pre-treatment (activating treatment).

By effecting the pre-treatment with nitrogen gas containing 5 volume % of hydrogen (hydrogen-containing inactive gas) on the Catalyst A, there was obtained a catalyst layer 12 in which of the ruthenium atoms present in the surface portion of the catalyst layer, more than 70% thereof was present in the form of metal (Ru(O)). Then, into a carbon monoxide remover 6 having this catalyst layer 12, the simulated reaction gas was introduced to allow the carbon monoxide removing reaction to occur. Thereafter, determination was made again by the ESCA on the ratio of ruthenium present in the form of metal in the surface portion of the catalyst layer 12. This revealed that the ratio was maintained over 70%. Based on this, it may be said that the condition of ruthenium on the catalyst surface can be maintained after the catalyst effected the carbon monoxide removing reaction.

Separately from the above, by effecting the pre-treatment with nitrogen gas containing 5 volume % of hydrogen (hydrogen-containing inactive gas) on the Catalyst A, there was obtained a catalyst layer 12 in which of the ruthenium atoms present in the surface portion of the catalyst layer, more than 70% thereof was present in the form of metal (Ru(O)). Then, into a carbon monoxide remover 6 having this catalyst layer 12, the simulated reaction gas containing 5 volume % of water vapor (corresponding to the dew point of 33° C.) was introduced. And, with raising the temperature of the reaction tube 11 to 140° C., the durability of the Catalyst A was investigated. Incidentally, in this experiment, the maximum temperature of the catalyst layer 12 was 160° C. The investigation revealed that the concentration of carbon monoxide at the exit of the carbon monoxide remover 6 was maintained below 5 ppm for the period of 4000 hours. In this way, it has been shown that the carbon monoxide removing catalyst according to the present invention can stably provide its carbon monoxide removing effect for an extended period of time.

<4>

Next, there will be described results of an experiment conducted to see whether improvement could be achieved in the performance of a carbon monoxide removing catalyst without the pre-treatment unlike the case described above.

The catalyst layer 12 was prepared from the Catalyst B without the pre-treatment. Then, into the carbon monoxide remover 6 including this catalyst layer 12 heated up to 70° C. in nitrogen gas, the simulated reaction gas containing water vapor at the water vapor concentration of 3 volume % (corresponding to a dew forming point of 25° C.) was introduced. Then, with setting the temperature of the reaction tube 11 to 80° C., the carbon monoxide removing reaction was allowed to occur. In this condition, the carbon monoxide concentration at the exit of the carbon monoxide remover 6 immediately after the start of the reaction was determined to be 4600 ppm and the carbon monoxide concentration at the exit of the carbon monoxide remover 6 was determined to be still 4600 ppm even after lapse of 12 hours. Incidentally, after lapse of 12 hours, the catalyst layer 12 was taken out and its catalyst surface was analyzed by the ESCA. The analysis revealed that of the ruthenium atoms in the surface portion of the catalyst layer, 11.4% of them were ruthenium present in the form of metal (Ru(O)). As described above, the carbon monoxide removing performance of the catalyst without the pre-treatment is low. And, even when this catalyst was used for providing the carbon monoxide removing reaction, there was observed no improvement in its carbon monoxide removing performance.

<5>

In the foregoing embodiment, the ratio of the ruthenium present in the form of metal (Ru(O)) in the surface of the catalyst layer was determined by using the ESCA. However, other analysis method may be used, provided such other method too provides substantially same measurement depth for the surface layer of the ruthenium catalyst.

<6>

With the carbon monoxide remover 6 made according to the present invention, the apparatus or device to be disposed upstream thereof is not particularly limited. Therefore, the types of the desulfurizing catalyst, reforming catalyst, carbon monoxide shift converting catalyst employed in the fuel gas reforming system are not limited in particular, but any conventional types of catalyst can be employed.

Further, the method of the invention can be used not only for the above-described case of reforming the natural gas (methane), but also for elimination of carbon monoxide contained in a reformed gas obtained through methanol reforming. In this, if the hydrogen-containing inactive gas consisting of 10 volume % or less of hydrogen and an inactive gas as the remaining gas is used for such activation, this gas can be used also as a reducing gas typically employed for activation (reduction) of other catalyst used in the fuel reforming system in which the carbon monoxide remover 6 is to be provided, e.g. an alcohol (methanol) reforming catalyst used for reforming alcohol (methanol). Therefore, the reducing gas for the carbon monoxide shift converting catalyst or the alcohol reforming catalyst described above can be used also as an activating gas for the carbon monoxide removing catalyst.

Incidentally, in the foregoing, nitrogen was employed as the inactive gas. Other gases such as helium gas, argon gas, or carbon dioxide gas will be relatively inexpensively available and can be stored easily. With use of such other gases too, since they hardly react with the materials forming the other components than the carbon monoxide removing catalyst, there will be achieved such effect as restricting occurrence of corrosion.

INDUSTRIAL APPLICABILITY

With the method of activating carbon monoxide catalyst, the carbon monoxide removing catalyst and the method of removing carbon monoxide all proposed by the present invention, carbon monoxide can be effectively removed even when the carbon monoxide removing catalyst is used at a low temperature range. Hence, it is possible to selectively reduce the carbon monoxide concentration without inviting the side reactions represented by methanation of carbon dioxide which would be problematic in the prior art using the catalyst at a high temperature.

Accordingly, in the case of a fuel cell system using the reformed gas obtained by the above-described apparatus construction, from the start of its operation, the carbon monoxide concentration of the reformed gas supplied thereto has been reduced to be lower than a predetermined value. Thus, the reformed gas can be obtained with minimizing loss of hydrogen due to such side reactions. Further, since the carbon monoxide concentration of the supplied reformed gas can be very low, the poisoning of the electrode catalyst in the fuel cell can be restricted very effectively, so that the service life of the electrode catalyst may be extended.

As described above, a reformed gas with a significantly reduced carbon monoxide concentration can be obtained. Consequently, it becomes possible to generate electric power with higher efficiency than the convention and to achieve the service life of the electric power generating system.

The invention claimed is:

1. A method of activating a carbon monoxide removing catalyst which has received a reducing treatment at the time of obtaining this catalyst, said carbon monoxide removing catalyst adapted for use in a fuel reforming system, the fuel reforming system manufacturing, through a reforming process, a mixture gas containing hydrogen as a main component thereof and carbon monoxide, and removing, through oxidation, the carbon monoxide from the mixture gas by causing the mixture gas and an oxidizer to react on the carbon monoxide removing catalyst, thus obtaining a reformed gas with the carbon monoxide oxidized/removed therefrom, wherein said reducing treatment at the time of obtaining the catalyst is a liquid phase reducing treatment; and wherein prior to its use in the carbon monoxide oxidizing/removing operation, said carbon monoxide removing catalyst is caused to contact an inactive gas or a hydrogen-containing inactive gas consisting of less than 50 volume % of hydrogen gas and the remaining volume of inactive gas at a temperature from 80° C. to 400° C., whereby said catalyst is activated.

2. The method of activating a carbon monoxide removing catalyst according to claim 1, wherein said inactive gas contains at least one kind of gas selected from the group consisting of nitrogen gas, helium gas and argon gas.

3. The method of activating a carbon monoxide removing catalyst according to claim 1, wherein said hydrogen-containing inactive gas consists of 10 volume % or less of hydrogen gas and the remaining volume of the inactive gas.

4. The method of activating a carbon monoxide removing catalyst according to claim 1, wherein with the activation of the carbon monoxide removing catalyst, 50% or more of ruthenium atoms present in a surface portion of the carbon monoxide removing catalyst layer as determined by ESCA are present as ruthenium in the form of metal.

* * * * *